United States Patent
Tuchrelo et al.

(10) Patent No.: US 12,439,937 B2
(45) Date of Patent: Oct. 14, 2025

(54) SELF CLEANING FLOW CONTROL VALVE IN CLEAN IN PLACE SYSTEM

(71) Applicant: RTA Associates, LLC, Victor, NY (US)

(72) Inventors: Robert Tuchrelo, Williamson, NY (US); Nathan E. Smith, Hamlin, NY (US); Richard T. Aab, Fairport, NY (US)

(73) Assignee: Clean Safer Systems, LLC, Victor, NY (US)

( * ) Notice: Subject to any disclaimer, the term of this patent is extended or adjusted under 35 U.S.C. 154(b) by 931 days.

(21) Appl. No.: 17/084,819

(22) Filed: Oct. 30, 2020

(65) Prior Publication Data

US 2021/0045408 A1    Feb. 18, 2021

Related U.S. Application Data

(63) Continuation of application No. 15/893,084, filed on Feb. 9, 2018, now Pat. No. 10,888,102.
(Continued)

(51) Int. Cl.
*B23K 11/30* (2006.01)
*A23G 9/04* (2006.01)
(Continued)

(52) U.S. Cl.
CPC ............... *A23G 9/30* (2013.01); *A23G 9/04* (2013.01); *A23G 9/12* (2013.01); *A23G 9/224* (2013.01);
(Continued)

(58) Field of Classification Search
CPC ............. A23G 9/30; A23G 9/228; B67D 1/07
See application file for complete search history.

(56) References Cited

U.S. PATENT DOCUMENTS

| 4,201,558 A | 5/1980 | Schwitters | A23G 9/045 |
| | | | 137/594 |
| 4,703,628 A | 11/1987 | Togashi | A23G 9/163 |
| | | | 222/55 |

(Continued)

FOREIGN PATENT DOCUMENTS

| JP | S 49-093578 A | 9/1974 |
| JP | S 53-043086 U | 4/1978 |

(Continued)

OTHER PUBLICATIONS

Prince, "Prince Control Valve", 4-Way, 3 Position Cylinder Spool; retrieved from https://www.amazon.com/Prince-Control-Valve-3-Position-Cylinder/dp/B0000AX2UL (Year: 2011).*

(Continued)

*Primary Examiner* — Ibrahime A Abraham
*Assistant Examiner* — Lawrence H Samuels
(74) *Attorney, Agent, or Firm* — Douglas R. Smith, Esq.; Harter Secrest & Emery LLP

(57) ABSTRACT

A self-contained food processor is provided for treating a food flow path in the food processor with a solution. The food flow path can be treated without requiring disassembly and reassembly of the food processor and without requiring direct operator input. The food processor includes a controller for directing passage of a solution through at least portions of the food flow path without requiring constant operator oversight. The food processor can employ available positive pressure water supply, such as public utility water pressure to selectively and automatically push solutions, including rinses, backwards or forwards through the food flow path in the food processor.

15 Claims, 16 Drawing Sheets

Related U.S. Application Data

(60) Provisional application No. 62/456,995, filed on Feb. 9, 2017.

(51) Int. Cl.

| | | |
|---|---|---|
| *A23G 9/12* | (2006.01) | |
| *A23G 9/22* | (2006.01) | |
| *A23G 9/28* | (2006.01) | |
| *A23G 9/30* | (2006.01) | |
| *B23K 11/31* | (2006.01) | |
| *B67D 1/07* | (2006.01) | |
| *F25C 1/14* | (2018.01) | |
| *F25D 23/12* | (2006.01) | |
| *G07F 13/06* | (2006.01) | |
| *G07F 17/00* | (2006.01) | |

(52) U.S. Cl.
CPC ............ *A23G 9/228* (2013.01); *A23G 9/283* (2013.01); *B67D 1/07* (2013.01); *F25C 1/14* (2013.01); *F25D 23/126* (2013.01); *G07F 13/065* (2013.01); *G07F 17/0071* (2013.01); *F25C 2400/12* (2013.01); *F25D 2400/22* (2013.01)

(56) References Cited

U.S. PATENT DOCUMENTS

| | | | | |
|---|---|---|---|---|
| 4,848,381 | A | 7/1989 | Livingston | A23G 7/00 134/57 R |
| 4,860,550 | A * | 8/1989 | Aoki | A23G 9/163 62/135 |
| 5,410,888 | A | 5/1995 | Kaiser | A23G 9/20 251/30.01 |
| 5,419,150 | A * | 5/1995 | Kaiser | A23G 9/163 62/342 |
| 5,799,832 | A | 9/1998 | Mayo | |
| 5,888,313 | A | 3/1999 | West | |
| 6,490,872 | B1 * | 12/2002 | Beck | A23G 9/228 62/342 |
| 6,494,055 | B1 * | 12/2002 | Meserole | A23G 9/163 366/310 |
| 6,536,224 | B2 | 3/2003 | Frank | A23G 9/045 251/253 |
| 6,553,779 | B1 * | 4/2003 | Boyer | A23G 9/045 62/342 |
| 6,689,410 | B2 | 2/2004 | Gerber | A23G 9/045 222/135 |
| 7,857,910 | B2 * | 12/2010 | Carhuff | B08B 9/0325 134/22.18 |
| 8,079,230 | B2 | 12/2011 | Frank | A23G 9/22 222/146.6 |
| 8,205,460 | B2 | 6/2012 | Russo | A23G 9/045 62/303 |
| 8,459,043 | B2 | 6/2013 | Bertone | A23G 9/045 62/1 |
| 9,848,620 | B2 * | 12/2017 | Minard | A23G 9/166 |
| 10,595,544 | B2 * | 3/2020 | Beth Halachmi | A23G 9/28 |
| 2002/0043071 | A1 * | 4/2002 | Frank | A23G 9/20 62/135 |
| 2002/0162577 | A1 | 11/2002 | Cocchi | A23G 9/30 134/18 |
| 2003/0012864 | A1 | 1/2003 | Gerber | B01F 7/086 426/665 |
| 2003/0126871 | A1 | 7/2003 | Frank et al. | |
| 2005/0269362 | A1 * | 12/2005 | Guerrero | A61L 2/22 222/1 |
| 2007/0062212 | A1 * | 3/2007 | Frank | A23G 9/28 62/342 |
| 2008/0061081 | A1 | 3/2008 | Guerrero | A61L 2/18 222/148 |
| 2009/0120306 | A1 | 5/2009 | DeCarlo | A23G 9/12 99/485 |
| 2010/0058772 | A1 * | 3/2010 | Russo | A23G 9/30 62/1 |
| 2015/0320079 | A1 * | 11/2015 | Minard | A23G 9/222 222/1 |
| 2016/0037963 | A1 | 2/2016 | Tuchrelo et al. | |

FOREIGN PATENT DOCUMENTS

| | | |
|---|---|---|
| JP | 58-015719 A | 1/1983 |
| JP | H01-043158 A | 2/1989 |
| JP | H 02-107160 A | 4/1990 |
| JP | 08-184380 A | 7/1996 |
| JP | 2002-307032 A | 10/2002 |
| JP | 2003-519571 A | 6/2003 |
| JP | 2003-521884 A | 7/2003 |
| JP | 2009-285566 A | 12/2009 |
| JP | 2012-020235 A | 2/2012 |
| WO | 1995015090 A2 | 6/1995 |
| WO | 2000070963 A1 | 11/2000 |
| WO | 0151224 A1 | 7/2001 |
| WO | 2009059405 A1 | 5/2009 |
| WO | 2014003881 A1 | 1/2014 |
| WO | 2015022678 A1 | 2/2015 |

OTHER PUBLICATIONS

Mathworks, 4-Way Directional Valve; retrieved on Mar. 22, 2023 from https://www.mathworks.com/help/hydro/ref/4waydirectionalvalve.html (Year: 2023).*

European Patent Office, Communication under Article 94(3) EPC in corresponding European Patent Application No. 18 707 202.0-1009, mailed Oct. 29, 2020.

IP Australia, Examination Report No. 1 in Australian Patent Application No. 2018219352 Mar. 4, 2020.

ISA/US, International Search Report and Written Opinion from PCT/US2018/017659, mailed Apr. 20, 2018.

* cited by examiner

SELF CLEANING FLOW CONTROL VALVE IN CLEAN IN PLACE SYSTEM

STATEMENT REGARDING FEDERALLY SPONSORED RESEARCH OR DEVELOPMENT

Not applicable.

REFERENCE TO A "SEQUENCE LISTING"

Not applicable.

BACKGROUND OF THE INVENTION

Field of the Invention

The present disclosure relates to an apparatus and method for treating at least a portion of a food processor with a solution and in a preferred configuration to treating at least a portion of a food flow path in the food processor with the solution.

Description of Related Art

It is generally understood that fluid dispensing systems having fluid lines that carry fluids to a point of use need cleaning from time to time in order to ensure that no deposits or microorganisms collect in the fluid lines. For example, beverage distribution systems employ the use of beverage lines to carry beverages from beverage containers, or tanks, to dispensing units, which dispense the beverages to drinking containers. If for some reason, these beverage lines are not cleaned on a regular basis, the collection of bacteria and deposits therein may contaminate the beverages thereby making the beverages unsafe to drink. Moreover, in commercial restaurant settings, food and health regulations actually require the periodic cleaning of beverage dispensing systems.

Similarly, food processors having a food flow path require periodic rinsing, cleaning and/or sanitizing.

It is well known to use portable chemical dispenser systems to clean out beverage lines and other components of beverage dispensing systems. With these portable systems, users have become quite effective in meeting the various requirements imposed by food and health regulations. However, these prior art methods are extremely time consuming and require the attention of at least one person to manually move the chemical dispense systems between each of the various beverage lines that require cleaning in a particular beverage dispense system. To add to the frustration, more and more restaurants are offering a larger variety of beverages than offered in years past, thereby making an extremely time demanding process even more demanding.

Therefore, a need exists for a system for selectively rinsing, cleaning and/or sanitizing a food flow path in a food processor with reduced operator input and time, while providing enhanced efficacy of the treatment.

BRIEF SUMMARY OF THE INVENTION

In one configuration, the present disclosure provides a food processor having a reservoir for retaining a food product; a freezer chamber fluidly connected to the reservoir and having an inlet port for passing the food product into the freezer chamber and an outlet port for passing the food product from the freezer chamber; and a drain port for draining the freezer chamber.

A further configuration is disclosed wherein the food processor, includes a food flow path; a reservoir in the food flow path for retaining a food product; a freezer chamber in the food flow path fluidly connected to the reservoir and having an inlet port for passing food product into the freezer chamber, an outlet port for passing food product from the freezer chamber and an access port; and a solution input line independent of the food flow path, the solution input line connected to the access port for introducing a solution into the freezer chamber.

The disclosure further provides a food processor having a reservoir for retaining a food product; a freezer chamber fluidly connected to the reservoir and having an inlet port for passing food product into the freezer chamber, an outlet port for passing food product from the freezer chamber and an access port; a solution component source; and a solution input line connected to the solution component source and the access port for passing a solution having the solution component into the freezer chamber.

A method is disclosed including the steps of isolating a supply of food product from a downstream freezer chamber, the freezer chamber having an inlet port for receiving the food product into the freezer chamber and an outlet port for passing the food product from the freezer chamber in a forward direction; and one of passing solution into and from the freezer chamber through an access port.

A further method is disclosed including providing a food processor with a flow control valve intermediate a reservoir for retaining a volume of food product and a downstream freezer chamber, the freezer chamber having an inlet port for receiving the food product into the freezer chamber and an outlet port for passing the food product from the freezer chamber; and providing the food processor with a drain port for draining the freezer chamber.

Another method is disclosed including isolating a supply of food product from a downstream freezer chamber, the freezer chamber having an inlet port for receiving the food product from the supply into the freezer chamber and an outlet port for passing the food product from the freezer chamber; draining the freezer chamber through a drain port; and introducing a solution into the freezer chamber independent of the inlet port and the outlet port.

A further method is disclosed including simultaneously (i) draining a freezer chamber of a food processor through a drain port, the freezer chamber including an inlet for receiving a food product into the freezer chamber and an outlet for passing the food product from the freezer chamber and (ii) introducing a solution into the freezer chamber.

A method is also disclosed including constructing a food processor for (i) draining a freezer chamber through a drain port, the freezer chamber having an inlet for receiving a food product and an outlet for passing the food product and (ii) introducing a solution into the freezer chamber.

Disclosed methods include providing a food processor configured to isolate a supply of a food product from a downstream freezer chamber, the freezer chamber having an inlet port for receiving the food product from the supply of food product into the freezer chamber and an outlet port for passing the food product from the freezer chamber; and providing the food processor for (i) draining the freezer chamber through a drain port and (ii) introducing a solution into the freezer chamber.

A further food processor is disclosed having a reservoir for retaining a food product; a processing station fluidly connected to the reservoir, the processing station configured to retain a given volume of food product, the processing station having an inlet port receiving the food product from the reservoir and an outlet port for passing the food product from the processing station; a drain port fluidly connected to the processing station for draining at least a portion of the given volume; a drain valve connected to the drain port for selectively permitting and precluding flow through the drain port; and a dispensing interface receiving the food product from the outlet port of the processing station.

An additional method is disclosed including providing a food processor with a flow control valve intermediate a reservoir for retaining a volume of food product and a downstream processing station, the processing station having an inlet port for receiving food product into the processing station and an outlet port for passing food product from the processing station; providing the food processor with a drain port for draining the processing station; and providing the food processor with an access port for passing one of a cleaning solution, a sanitizing solution, sterilizing solution and a rinse solution to the processing station.

In a further configuration a method is provided including the steps of locating a volume of a solution within a portion of a food flow path in a food processor; reducing a temperature of the solution to create a flowable media including solid frozen particles of the solution; and passing the flowable media through a portion of the food flow path to scrub the portion of the food flow path.

A further processor is provided having a food flow path; a reservoir in the food flow path for retaining a food product; a freezer chamber in the food flow path fluidly connected to the reservoir and having an inlet port for passing food product into the freezer chamber and an outlet port for passing food product from the freezer chamber; and a solution in the freezer chamber; wherein the freezer chamber is configured to reduce a temperature of the solution to form a flowable media formed of solid frozen particles of the solution.

BRIEF DESCRIPTION OF THE SEVERAL VIEWS OF THE DRAWING(S)

DETAILED DESCRIPTION OF THE INVENTION

Figure 1:
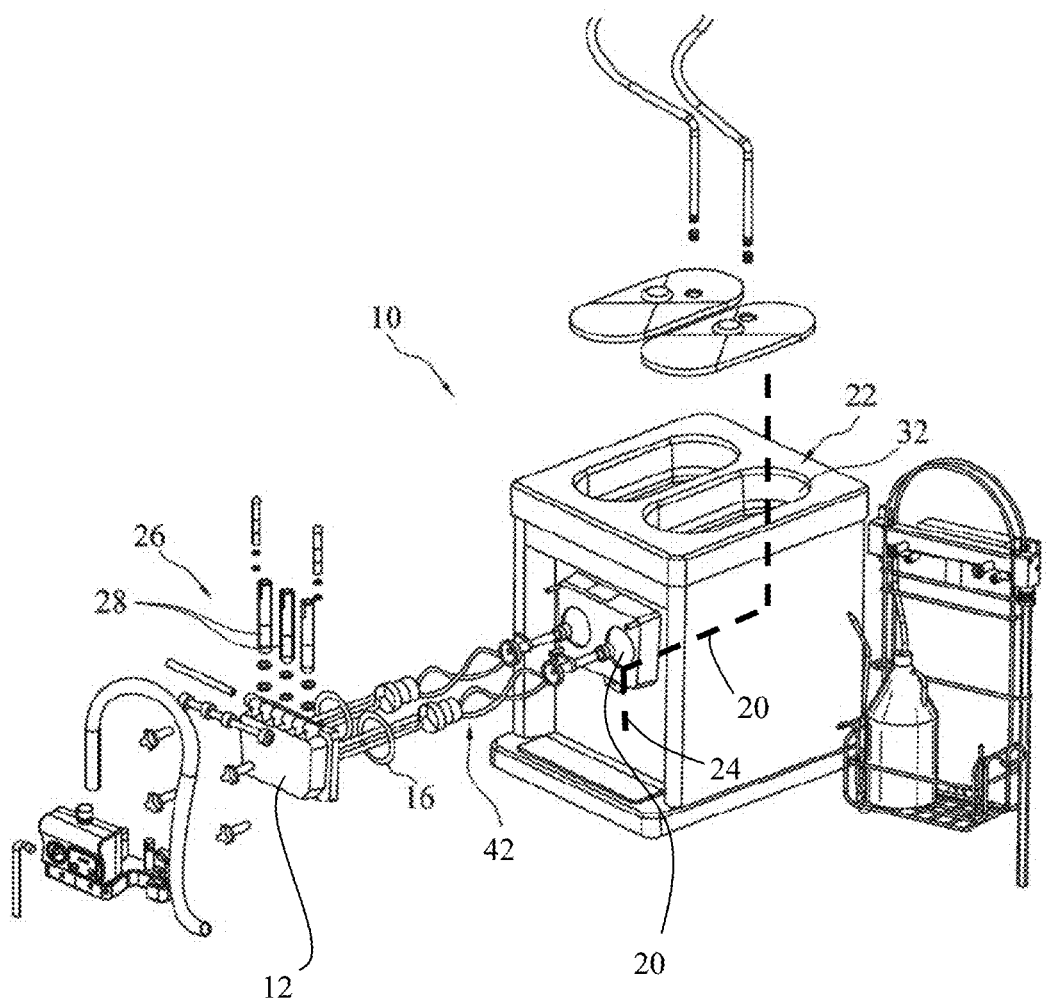
FIG. 1 is an exploded perspective view of a representative food processor.

FIG. 1 illustrates a representative food processor 10. The food processor 10 can be any of a variety of configurations for processing any of a variety of food products including, but not limited to, frozen or chilled food product including but not limited to, beverages such as sodas, beer or wine, ice or iced food products, desserts, diary based products as well as cooked and/or extruded food product.

Figure 2:
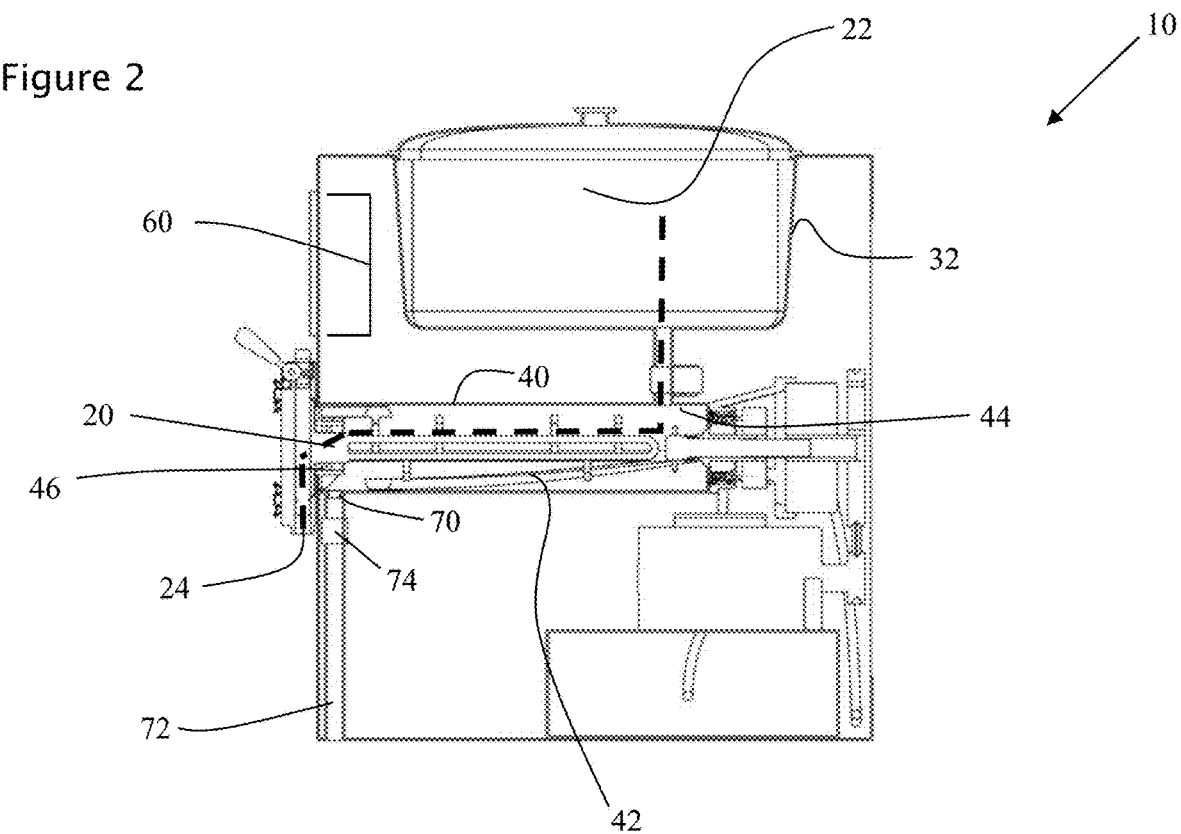
FIG. 2 is side elevational cross sectional view of the food processor.

Referring to FIGS. 1 and 2, in one configuration, the food processor 10 includes a first food flow path 20 and a second food flow path 20' extending from an input or upstream portion or end 22, such as a reservoir, feed tube, bag, box, line inlet or a hopper 32 to an output or downstream portion or end 24, such as a dispensing interface 26 from which the food product exits the food processor. While the hopper 32 is shown as a reservoir of the food product (or a food product precursor or food product constituent all herein collectively referred to as food product), it is understood the food product can be introduced from the feed tube, bags, line inlets, hoppers, bags or boxes located above, at or below a level of the food processor 10 or a portion of the food processor.

Although the food processor 10 is set forth in terms of a first food flow path 20 and a second food flow path 20', it is understood that an additional plurality of food flow paths can be employed such as three, four, five or more. As set forth below, the present disclosure is readily scalable to accommodate additional flow paths.

The food processor 10 can include any variety of devices, including but not limited to soft serve machines, batch freezers, slush freezers, shake freezers, blended ice machines or food processors for extruding food products which include flows, grains or meats as well as liquid dispensers for beverages including soft drinks, diary drinks or alcoholic beverages such as fermented or distilled spirits. Thus, the food product can be any corresponding product for consumption, wherein the food product may be subjected to processing that includes temperature control including but not limited to raising or lower a temperature, food product mixing, blending, altering, processing or extruding by the food processor 10. The food product can include precursor food products that change composition or consistency by virtue of being processed along the food flow path 20, wherein they can be converted to a processed food product.

The food processor 10 includes motors for driving the moving components as well as a refrigeration system, including a compressor and radiator as known in the art.

The food processor 10 also includes a controller 60 for selectively controlling the operation of the components of the food processor such as chillers or coolers, agitation components, motors as well as valving for flow control as set forth below. The controller 60 is generally known in the art and includes a processor for implementing instructions and a memory for storing instructions as well as acquired data. The programming of the controller 60 to perform the functions as set forth herein is well known in the art and can be provided by commercially available controllers in food processors, including soft serve machines.

The food product passes, in a normal or forward direction along each food flow path 20, from the input end 22 to the output end 24. Thus, in terms of the normal or forward flow direction along each food flow path 20, each path includes an upstream portion and a downstream portion.

In certain configurations as seen in FIGS. 1 and 2, each food flow path 20 can incorporate a number of processing stations 40 intermediate the upstream or input end 22 (such as a hopper 32) and the downstream or output end 24, (such as a dispensing valve 28). For example, the processing stations 40 can include mixing chambers and temperature control chambers, such as freezer chambers or barrels, along the food flow path 20. The mixing chambers include chambers for mixing ingredients provided in a stream as well as ingredients from different inputs such that the mixing chamber provides a volume for initial combination of different ingredients. The temperature control chambers can be used to heat the food product, wherein the heating merely changes temperature or imparts a chemical change in the food product. Similarly, the temperature control chamber as the freezer chamber, can reduce the temperature of the food product, or impart a chemical change. The freezer chamber can be alternatively referred to as the freezer barrel. The refrigeration system of the food processor 10 is typically thermally coupled to the processing station 40 as a temperature control chamber and in certain configurations, the hopper 32.

In further configurations, processing stations 40, such as the mixing chamber and/or temperature control chamber of FIG. 2 can include a blade or beater assembly 42 for agitation of the food product within the chamber, such as by rotation of the assembly within the chamber. Thus, the given processing station 40 can provide mixing, agitation and/or temperature control of the food product. With respect to the mixing or agitation, collectively referred to as mixing, it is understood the mixing can be accomplished by a fixed assembly, wherein the chamber rotates. That is, there is relative motion between the blade or beater assembly 42 and the chamber.

The processing station 40 includes an inlet 44 receiving food product from an upstream portion of the food flow path 20 and an outlet 46 for passing food from the processing station to the downstream portion of the food flow path. It is understood, the processing station can include a plurality of inlets 44 for receiving a plurality of components of the food product or receiving the food product from a plurality different sources. Similarly, the processing station 40 can include a plurality of outlets 46 for passing the food product to a plurality of different downstream processing stations or dispensing interfaces.

In certain configurations, the food flow path 20 terminates at a dispensing interface 26 which includes at least one dispensing valve 28 for selectively passing or allowing passage of the processed food product from the food processor 10. In certain configurations, the dispensing interface 26 includes a plurality of dispensing valves 28, such as but not limited to one, two, three or more. It is contemplated that each food flow path 20 can include a dispensing valve 28 or a plurality of food flow paths can terminate at a given dispensing valve.

Alternatively, each food flow path 20 can function primarily as a conduit from the input end 22 to the dispensing interface 26. In these configurations, the food processor 10 can function merely to selectively dispense the food product or can provide an alteration or conditioning of the food product such as temperature change, carbonation as well as mixing (compounding). Examples of the food processor 10 having these food flow paths 20 include dispensing devices such as automated soda dispensers, beer and wine dispensers.

It is further understood each food flow path 20 can include a plurality of inputs 22 with a corresponding smaller or a greater number of outputs 24 depending on the intending operating function of the food processor 10. The plurality of inputs 22 and plurality of outputs 24 can correspond to the number inlets 44 and outlets 46 of the processing station 40, or can be greater or smaller in number, depending on the configuration of the food processor 10.

Figure 3:
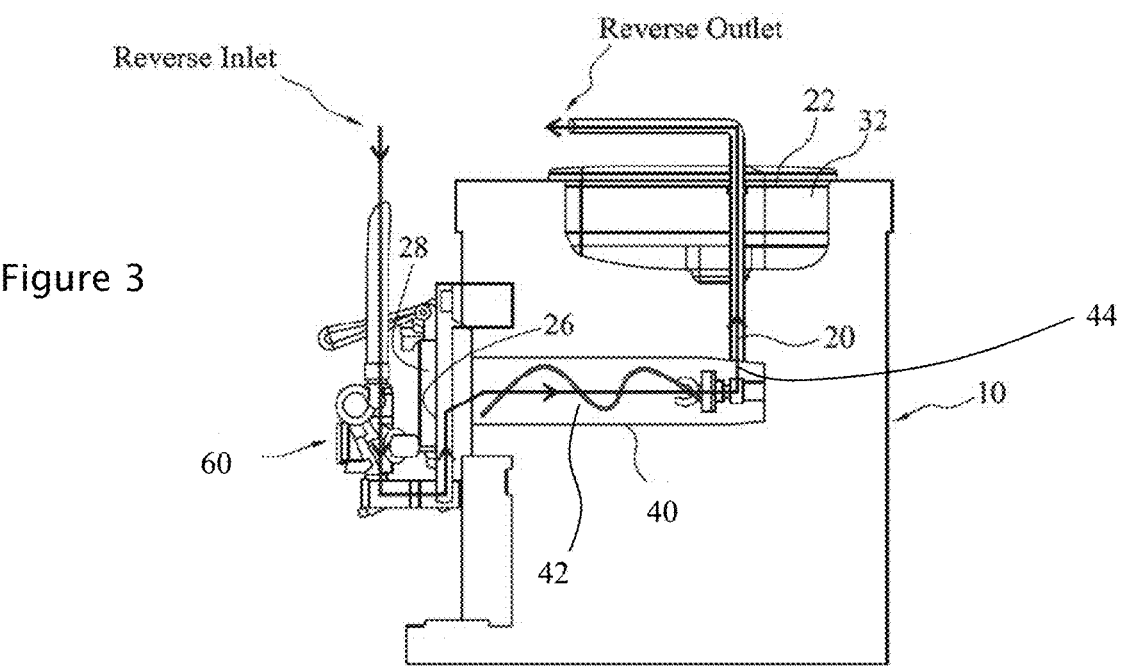
FIG. 3 is side elevational view of the food processor showing a reverse flow through the food processor.
Figure 4:
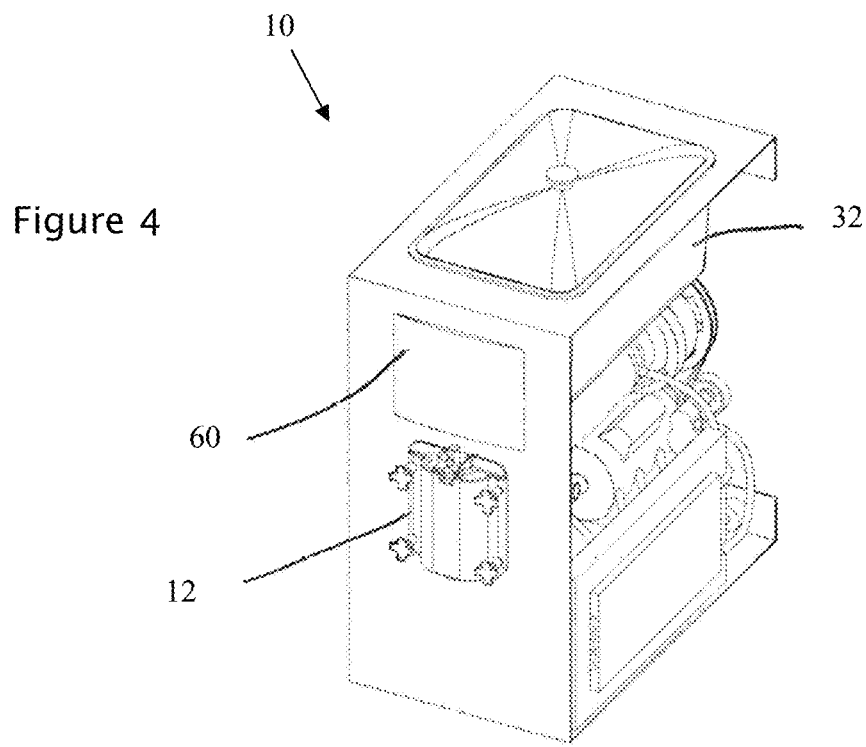
FIG. 4 is front perspective view of the food processor with a portion of an outer housing removed.
Figure 5:
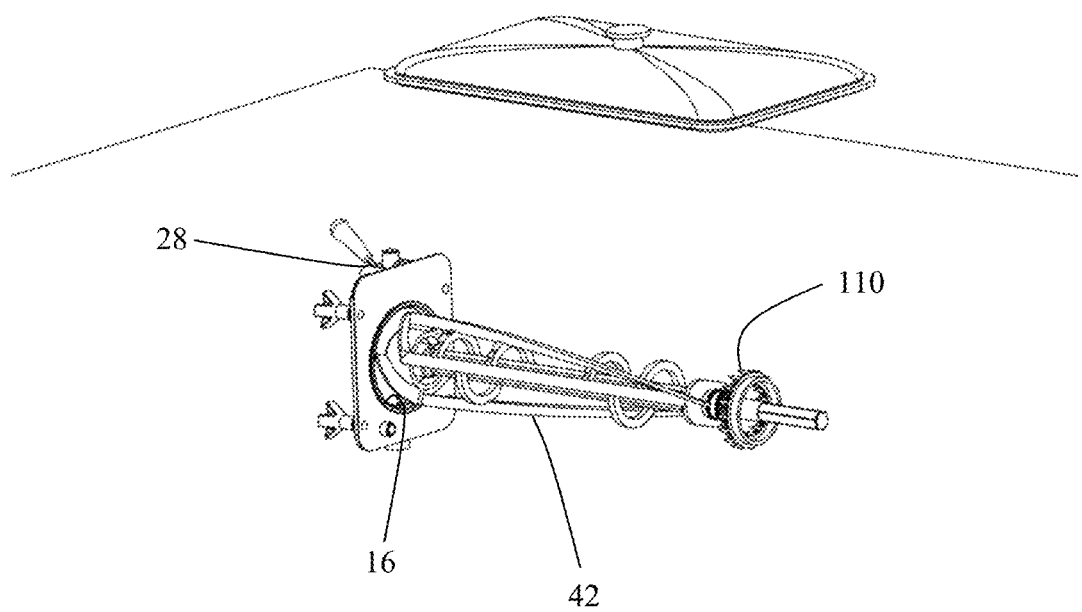
FIG. 5 is perspective view of a beater assembly for the food processor.

For purposes of illustration, a reverse direction or flow in the representative food flow path 20 is indicated by arrows in FIG. 3.

While the input or upstream end 22 of the food flow path 20 is shown in FIG. 2, above the output or downstream end, it is understood the input can be located below the output, wherein the food product is pumped up from a supply, hopper or reservoir 32 and along the food flow path to exit at the dispensing interface 26. For purposes of description, the reservoir, which can be integral, single use or multiple use is referred to as the hopper 32.

In one configuration of the food processor 10, the food processor includes a front door 12 movable between a closed, operating position and an open, maintenance or cleaning position. As known in the art, an interface between the door 12 and the freezer chamber 40 can include a peripheral chamber seal or chamber gasket 16.

In certain instances of treating the food flow path, including but not limited to cleaning, rinsing, disinfecting, sanitizing, sterilizing or maintaining the food processor 10, a solution is passed through at least a portion of the food flow path 20.

The term solution is intended to encompass a cleaning, rinsing, sanitizing, disinfecting or sterilizing solution, as well as combinations or mixtures. The cleaning, rinsing, sanitizing, disinfecting or sterilizing referred to herein as treating. For purposes of description, the present system is set forth in terms of using the solution, however it is understood the term solution encompasses cleaning agents as well as a single constituent solution such as but not limited to water (or other liquid) such as a rinse that may be employed. The term solution also includes a gas or vapor such as steam as well as other disinfecting gas. It is understood, the present system can employ any of a variety of cleaning, rinsing, sanitizing, disinfecting or sterilizing solution materials including liquids, gases and combinations thereof. The solution can be at least partly formed by an addition of an acidic or basic wash concentrate to public utility water. Exemplary acidic washes for the solution include citric, lactic, malic, acetic, adipic, fumaric, glutaric, tartaric, succinic, propionic, aconitic, sorbic, gluconic, ascorbic, and/or humic acids and at least one of sodium dodecyl sulfate and sodium lauryl sulfate.

The flow of the solution through the portion of the food flow paths 20 can be in the forward, normal direction or a reverse direction. The normal, or forward flow, originates at the input 22, or at least an upstream location spaced from the dispensing interface 26, and terminates at the output 24, or at least a downstream location nearer to the dispensing interface. That is, the normal direction includes the same direction as the food product to be dispensed flowing through the food flow path. The reverse flow, or reverse direction, originates at the output end 24, or at least downstream location (relative to the forward flow) and terminates at the input end 22, or at least an upstream location (relative to the forward flow). That is, the reverse flow flows opposite to the direction the food product passes through the food flow path during processing for dispensing from the food processor 10. The reverse flow encompasses flow in a reverse direction along a portion of the food flow path or along at least substantially the entire length of the food flow path.

The flow of the solution includes a continuous flow through at least a portion of the food flow path 20 for treating, such as but not limited to cleaning, sanitizing, sterilizing, disinfecting or rinsing, the portion of the food flow path. That is, in the continuous flow, the flow can move unimpeded by closed valves or shut-offs acting on the food flow path 20. Thus, continuous flow can include a flow that is introduced into the food flow path 20 but has not yet reached an exit point or drain, because a sufficient volume has not yet been introduced. It is understood flow for treating can be through the entire food flow path 20 or at least a portion of the food flow path. The continuous flow can be varied but is cumulatively sufficient to treat the respective portion of the food flow path. The continuous flow is sufficient to dislodge particulate matter from the surfaces of the food flow path and entrain the particulate matter into the flow.

As seen in FIGS. 2 and 6-8, the present food processor 10 includes a primary drain port 70 in the food flow path 20 between the input end 22 to the output end 24, and in certain configurations between the hopper 32 and the dispensing valve 28, and in other configurations between the processing station 40 and the dispensing valve 28, and in select configurations the primary drain port is located in at least one of the processing stations. Thus, the drain port 70 can be upstream of, downstream of, or located within the processing station 40. In one configuration of the food processor 10, the primary drain port 70 is in at least one of the food flow path 20 and the processing station 40, such as the freezer chamber. The primary drain port 70 is separate from the inlet 44 and the outlet 46 of the respective processing station 40 and distinct from the dispensing of the food product from the food processor 10 in the normal production manner through the dispensing interface 26.

As seen in FIGS. 6-8, 12 and 17-19 select configurations of the food processor 10 include a flow control valve 54 intermediate the reservoir, feed tube, line inlet 22 or the hopper 32 and the processing station 40. The flow control valve 54 is moveable between a closed position precluding flow from the hopper 32 to the processing station 40 and an open position permitting flow from the hopper to the processing station. Thus, the flow control valve 54 can function as an isolating valve for selectively isolating a first portion of the flood flow path 20 from a second portion of the food flow path. By isolating a first portion of the food flow path 20, flow between the first portion and a second portion of the food flow path is terminated.

In a further configuration the dispensing valve 28 can be spaced from the upstream processing station 40 by a section of tubing, such as a spacer, in the food flow path 20. In these configurations, the primary drain port 70 can be located in the spacer.

In yet further configurations of the food processor 10, the primary drain port 70 can be downstream of the dispending valve 28 or can be defined by the dispensing valve.

The primary drain port 70 is fluidly connected to a primary drain line 72. The primary drain line 72 includes an internal portion and can terminate at either a fitting for connection to an external drain or include sufficient length to reach the external drain. The drain port 70 can be fluidly connected to an internal drain, such as a reservoir or sump, which can be removable from the food processor 10 or configured to be pumped out, as known in the art.

The primary drain line 72 includes valving to isolate the primary drain line from the food flow path 20. Specifically, the primary drain line 72 includes a primary drain valve 74 for selectively passing fluid, including food product, from the food flow path 20 through the primary drain line. While the primary drain valve 74 can be spaced from the primary drain port 70, in one configuration the primary drain valve is at the primary drain port and can functionally define the primary drain port.

The food processor 10 further includes a solution input line 80 for presenting a solution, which can include or function as a motive fluid introduced to the food flow path 20. In one configuration, the solution input line 80 connects to the primary drain line 72 at a solution input valve 82. The solution input line 80 includes an interface 84 for fluidly connecting to a source of pressurized water such as a public utility water or an integral reservoir. As set forth below, the solution input line 80 can be used to deliver the solution to the food flow path 20.

Figure 7:
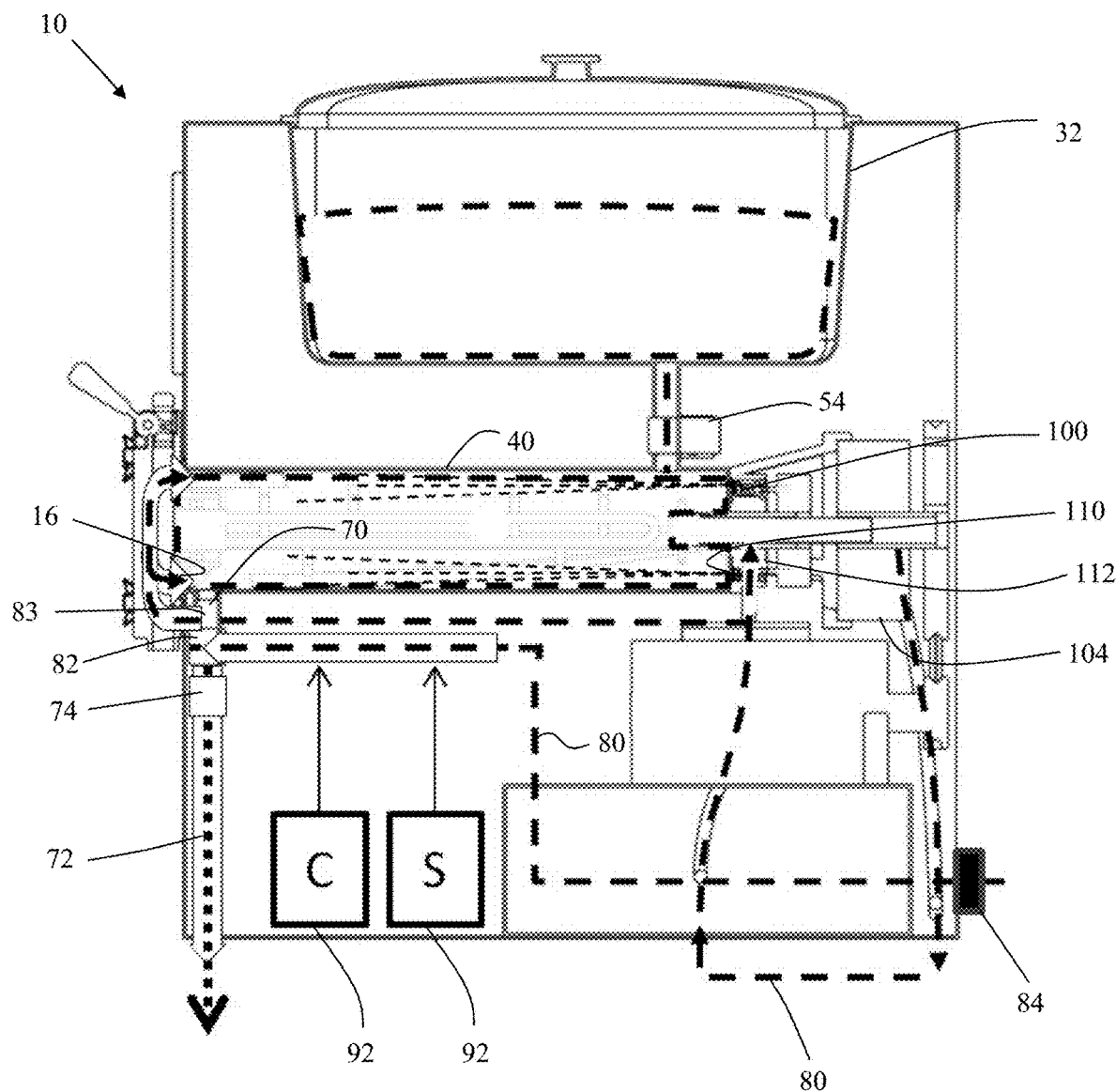
FIG. 7 is a cross sectional view of a further configuration of the food processor showing a no-flow configuration solution flow path.

Referring to FIG. 7, the solution input line 80 can include a port 83 at the door seal (door gasket 16), wherein during normal operation of the food processor 10 the gasket seals the solution input line from food flow path 20. However, upon sufficient fluid pressure in the solution input line 80, the gasket 16 is partially unseated to admit solution into the food flow path 20 such as at the freezer chamber 40.

The source of solution, can be internal to the food processor 10, external to the food processor or a combination of internal and external components. For example, in the internal configuration, the food processor 10 can include a solution reservoir within the food processor, wherein the solution reservoir is sized to retain a sufficient volume of the solution to perform the intended operation on the food flow path 20. In the external configuration, the solution input line 80 can function as a solution source, which is selectively connectable to the food flow path 20. In the combination configuration, the food processor 10 can include a solution concentrate or component reservoir(s) 92 from which a concentrate, component or additive is selectively entrained into a flow in the solution input line 80 which is then introduced into the food flow path 20. In a further configuration, the flow control valve 112 can be pressure actuated, such that in response to a predetermined pressure acting on the flow control valve, the flow control valve is moved to an open position permitting flow there through.

It is understood the solution reservoir and the solution concentrate reservoir 92 can be a single reservoir or a plurality of reservoirs corresponding to the intended solutions to the introduced into the food flow path 20. That is, there may be a separate cleaning solution and separate sanitizing solution as well as a rinse solution with corresponding cleaning solution concentrate reservoir, sanitizing solution concentrate reservoir, and rinsing solution concentrate reservoirs 92.

The reservoir of solution or the solution concentrate reservoir 92 can be pressurized to provide the motive force for the introduction of the solution into the food flow path 20 or the combination of the components into the solution. The pressurization can be accomplished by any of a variety of know mechanisms including bottled gas as well as compressor pumps, either independent of the food processor 10 or integral with the food processor. The combining of the solution concentrate with the motive fluid can be accomplished by a variety of mechanisms including but not limited to a metering pump, having a given volume per stroke or cycle as well as in-line dispensers for dispensing in response to flow or by a venturi as well as direct user introduction.

The communication of the respective solution concentrate reservoir 92 and the solution input line 80 (solution input line) can be valved to preclude or permit flow in accordance with the intending operations. The valving can be operable controlled by the controller 60. The control can be by virtue of individual valve control or implementation of a procedure or protocol involving a plurality of valve controls and associated timing.

In addition, certain configurations the present food processor 10 include an access port 100 in the food flow path 20. The access port 100 can be located at any of a variety of locations along the food flow path 20, such as (i) between the processing station 40 and the input end 22, reservoir or hopper 32, (ii) within the processing station 40 or (iii) effectively jointly located with a port, such as the primary drain port 70. The access port 100 is configured to selectively permit fluid communication to, or with, a portion of the food flow path 20, such as the processing station 40. In select configurations, the access port 100 fluidly communicates with the solution input line 80, either directly or indirectly through intermediate lines or flow control valves.

The access port 100 can include a variety of configurations for introducing the solution into the food flow path 20 and particularly the processing station 40. Referring to FIG. 7, the access port 100 located in the processing station 40 includes a nozzle head 110 for introducing the solution into the processing station. The nozzle head 110 can have any of a variety of configurations including spray manifolds for providing streams or jets, wherein the controller 60 can control valving for intermittent or sequenced continuous introduction. The nozzle head 110 can include a single or a plurality of orifices for passing the solution to the food flow path 20. The nozzle head 110 is connected to the solution input line 80. The connection can include a flow control valve 112 for selectively permitting or precluding a flow of solution through the access port 100. The flow control valve 112 can be operably connected to the controller 60.

Although the access port 100 and the primary drain port 70 can be separate ports, it is contemplated these ports can be implemented by a single opening or port that is valve regulated in a manner to permit the selective discharge of food product from the food flow path 20 and the selective introduction of solution into the food flow path. The access port 100 and the primary drain port 70 can thus be the same port or different independent ports.

Certain configurations of the food processor 10 also include a secondary drain port 120 in the food flow path 20. The secondary drain port 120 is fluidly connected to a secondary drain line 122. The secondary drain line 122 can pass to an external drain or an internal storage for subsequent disposal or recycling or connect to the primary drain line 72.

While the secondary drain port 120 can be disposed at a variety of locations along the food flow path 20, in one configuration, the secondary drain port can be incorporated into the flow valve 54 intermediate the hopper and the processing station 40. For example, the flow valve 54 can be a three way valve set, wherein two of the ports interface with the food flow path 20 and the third port is the secondary drain port. Thus, the three way flow valve set can be positioned (i) to provide flow along the food flow path 20 while blocking the secondary drain port, (ii) to preclude flow along the food flow path through the valve and maintain the secondary drain port 120 closed or (iii) to preclude flow along the food flow path through the valve while permitting flow from a portion of the food flow path through the secondary drain port.

Alternatively, the flow valve 54 and a separate secondary valve 124 can be employed to provide the recited flow control between the reservoir, hopper 32 and the processing station 40, wherein depending on the specific configuration of the food processor either valve could function as a drain valve for passing material from the food flow path 20 or an introduction valve for introducing material into the food flow path.

While the food processor 10 is shown with the solution input line 80 connected to a municipal water supply, it is contemplated the food processor can include a motive flow reservoir and a pump 104 or just the pump communicating with the solution input line 80 for providing the motive flow in the solution input line 80. As with the valving of the food processor 10, the pump can be operably connected to the controller 60.

As portions of the primary drain line 72, the secondary drain line 122, the drain port 70, the access port 100, the nozzle head 110 and solution input line 80 are proximal to the freezer chamber 40, these portions that retain solution can be exposed to below freezing temperatures and hence freeze, thereby obstructing or blocking respective flows. The food processor 10 can include a circulating loop 130 in thermal contact with these portions of the food processor 10 for circulating a fluid, in either a closed loop or as a portion of the solution flow. The circulation in the circulating loop 130 is configured to reduce or prevent freezing with these portions of the food processor 10.

It is contemplated the pump 104 can function as a circulating pump, shown in FIGS. 9-12, 14 and 15 can be used to provide circulation through the circulating loop 130. However, it is understood a separate pump can be employed as a circulating pump.

Figure 10:
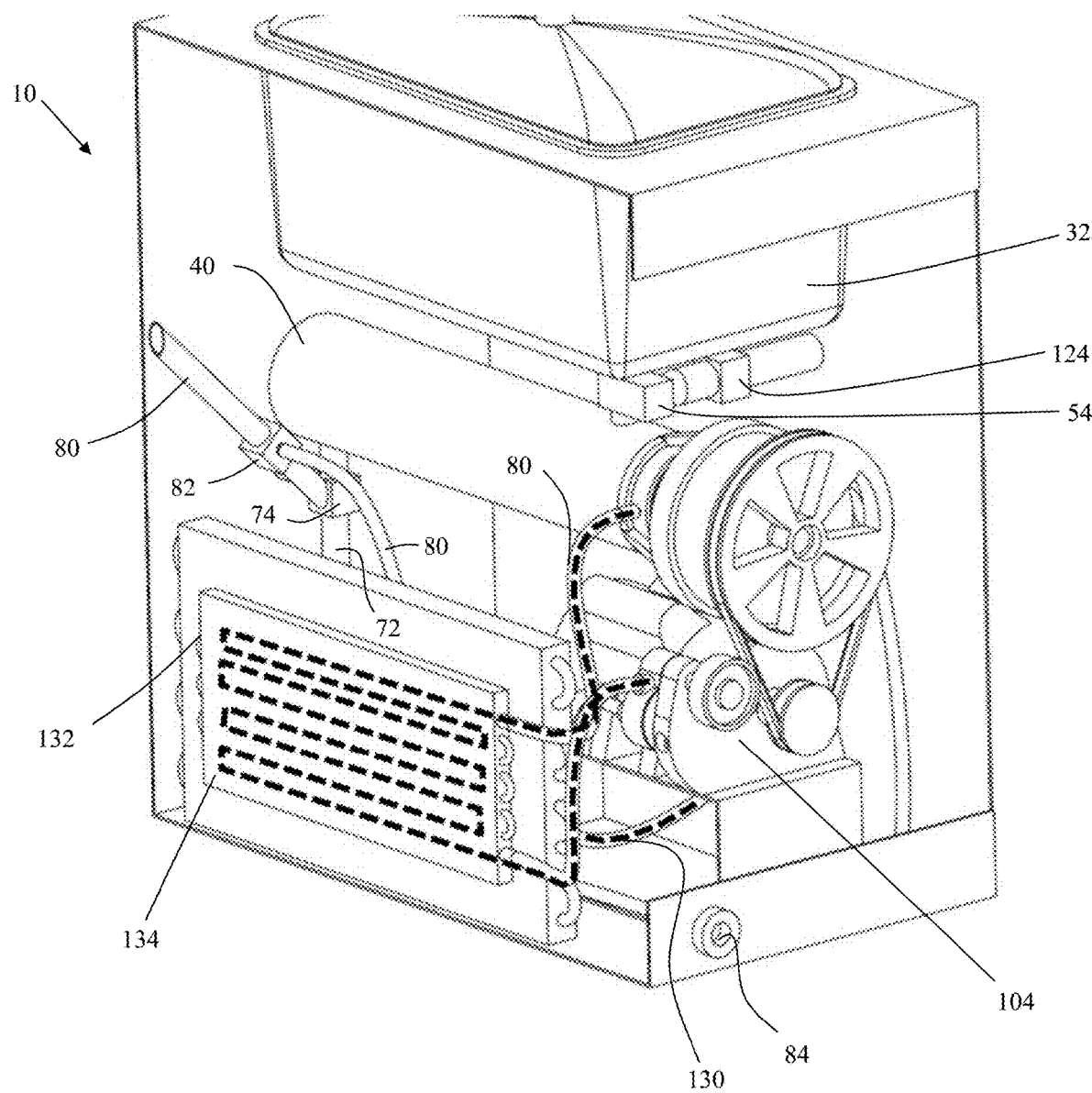
FIG. 10 is a perspective view of a configuration of the food processor showing a circulating pump fluidly connected to a heat exchanger.

As seen in FIG. 10, it is further contemplated the circulating loop 130 can be thermally coupled to a heater 132 for selectively controlling the temperature of the solution, or the circulating liquid in the circulating loop. That is, it is contemplated the circulating loop 130 can be define a portion of the solution input line 80 or be fluidly connected to the solution input line. A flow control valve 136 can selectively fluidly connect the circulating loop 130 and the solution input line 80 so that residence time of the solution within the circulating loop can be controlled to ensure efficacy of the heated solution. It is further contemplated, the circulating loop 130 can be a closed loop, separate from the solution input line 80.

The heater 132 can be a dedicated heater, such as a resistive heater or a thermal jacket, such as a water jacket, operably connected to the controller 60 or manually controllable. In another configuration, the heater 132 is a heat exchanger 134 thermally coupled to the existing radiator of the food processor 10 for harvesting waste heat from the standard motors or compressors of the food processor 10.

The temperature of fluid in the circulating loop 130 can thus be maintained above a freezing temperature or even at an elevated temperature depending upon intended operating parameters. The circulating loop 130 can include valving for selectively bypassing the heater 132 so as to provide temperature control of the circulating loop. The circulating pump 140 and valving can be operably connected to the controller 60 for maintaining the desired temperature within the circulating loop 130 or the thermally connected portions of the drain lines and solution paths.

In one configuration of the food processor 10, the pump 104 can function as an auxiliary pump operably connected to the controller 60 and one of the lines carrying the solution in the solution input line 80, wherein the auxiliary pump can induce a sufficient flow within the line carrying the solution to substantially precluding freezing of the solution within the line during intended operating parameters of the food processor 10. Alternatively, the pump 104, typically under direction of the controller 60, can be used to induce circulation in the lines carrying solution. It is further contemplated, a separate auxiliary pump can be employed, separate from the pump 104.

Figure 11:
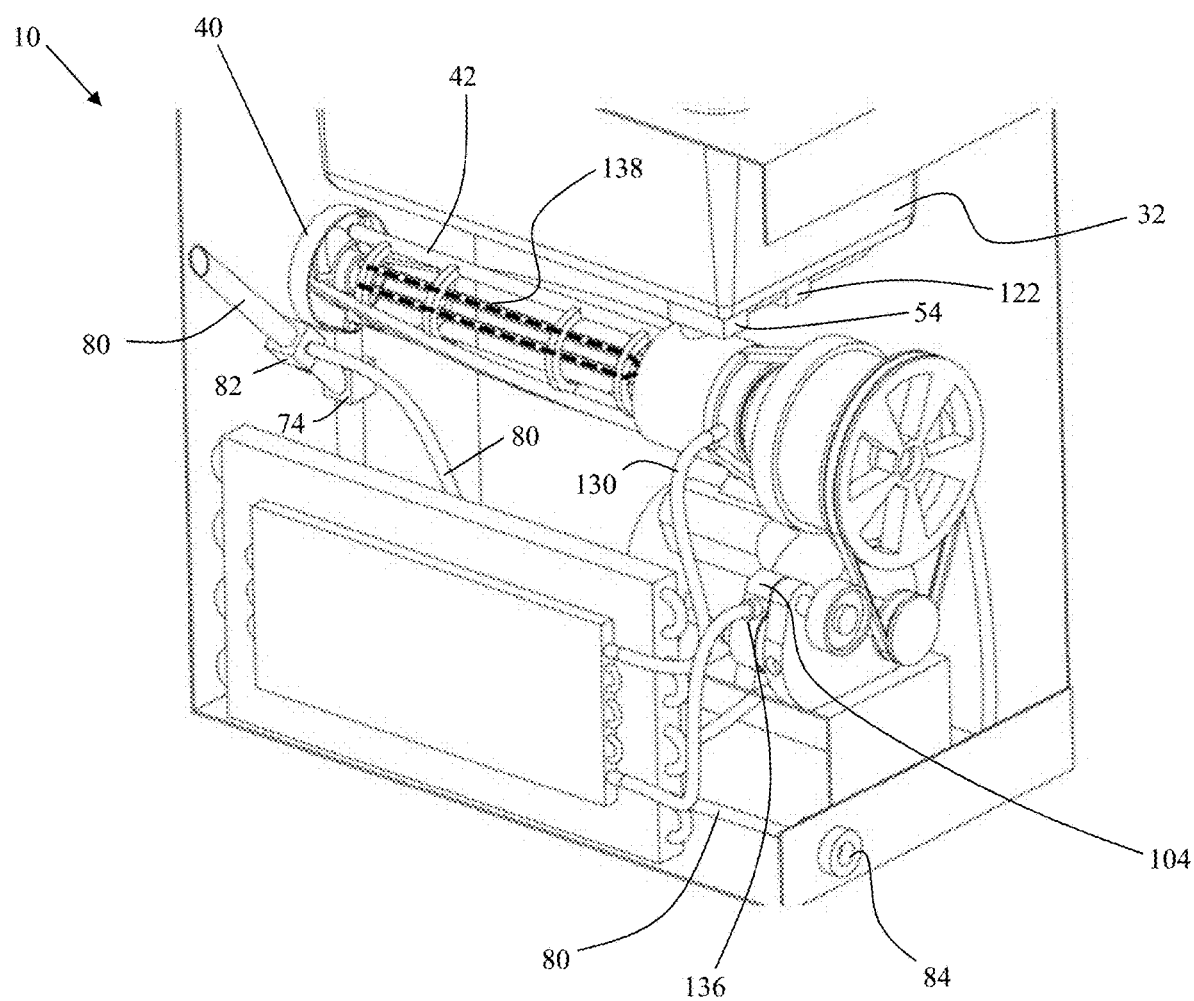
FIG. 11 is a perspective view of a configuration of the food processor showing a heater in a beater assembly.

Referring to FIG. 11, in a further configuration, the processing station 40 can include a heater 138 for heating food product within the processing station. The heater is operably connected to the controller 60 for selective actuation under the control of the controller. In one configuration, the heater 138 is incorporated within the beater assembly 42. The heater 138 can be a resistive heater, a heat exchanger or thermally coupled to a heat exchanger 134 or fluidly connected to the circulating loop 130 for selective thermal control by the controller 60.

Figure 12:
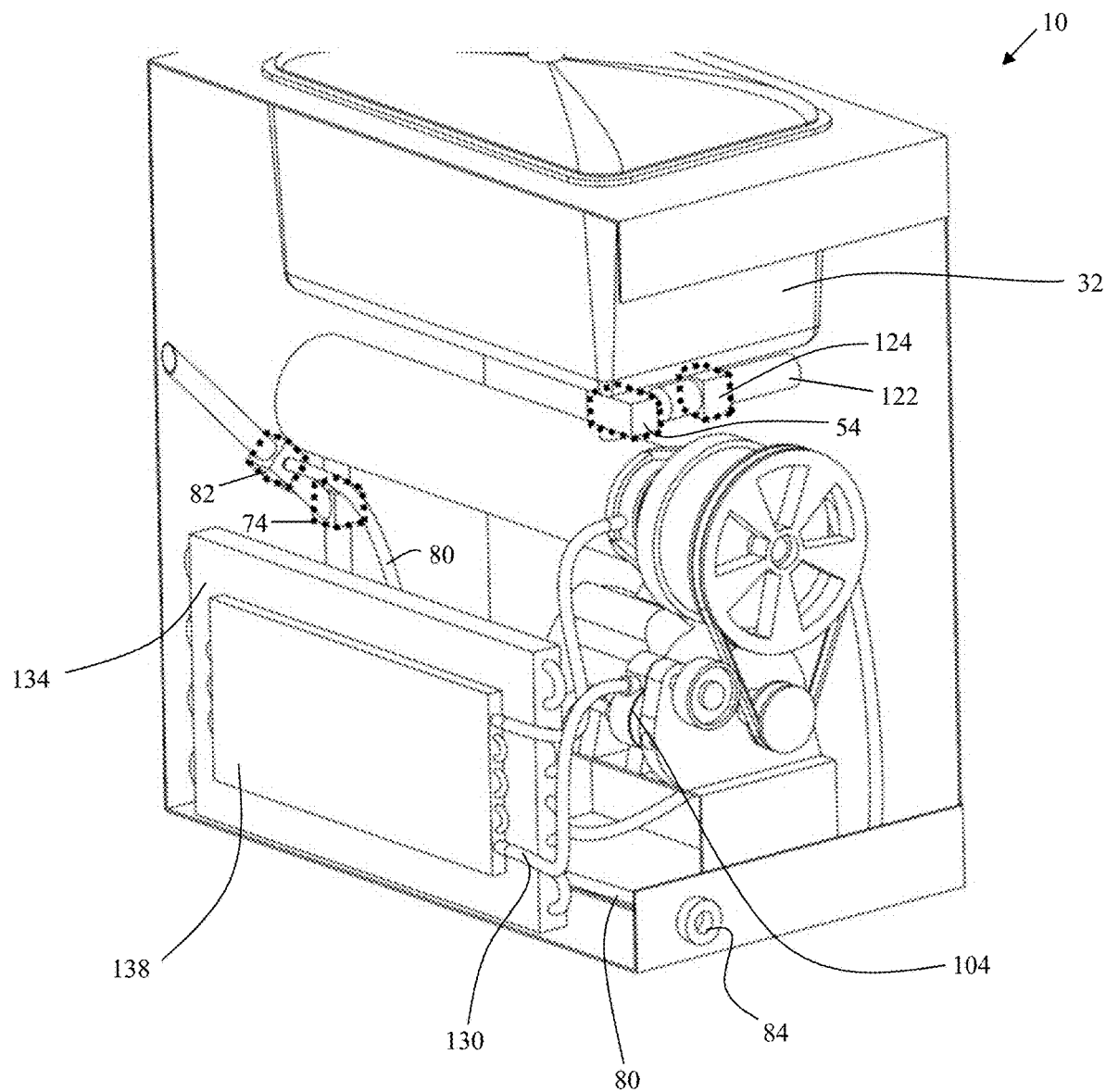
FIG. 12 is a perspective view of a configuration of the food processor showing a plurality of flow control valves.
Figure 13:
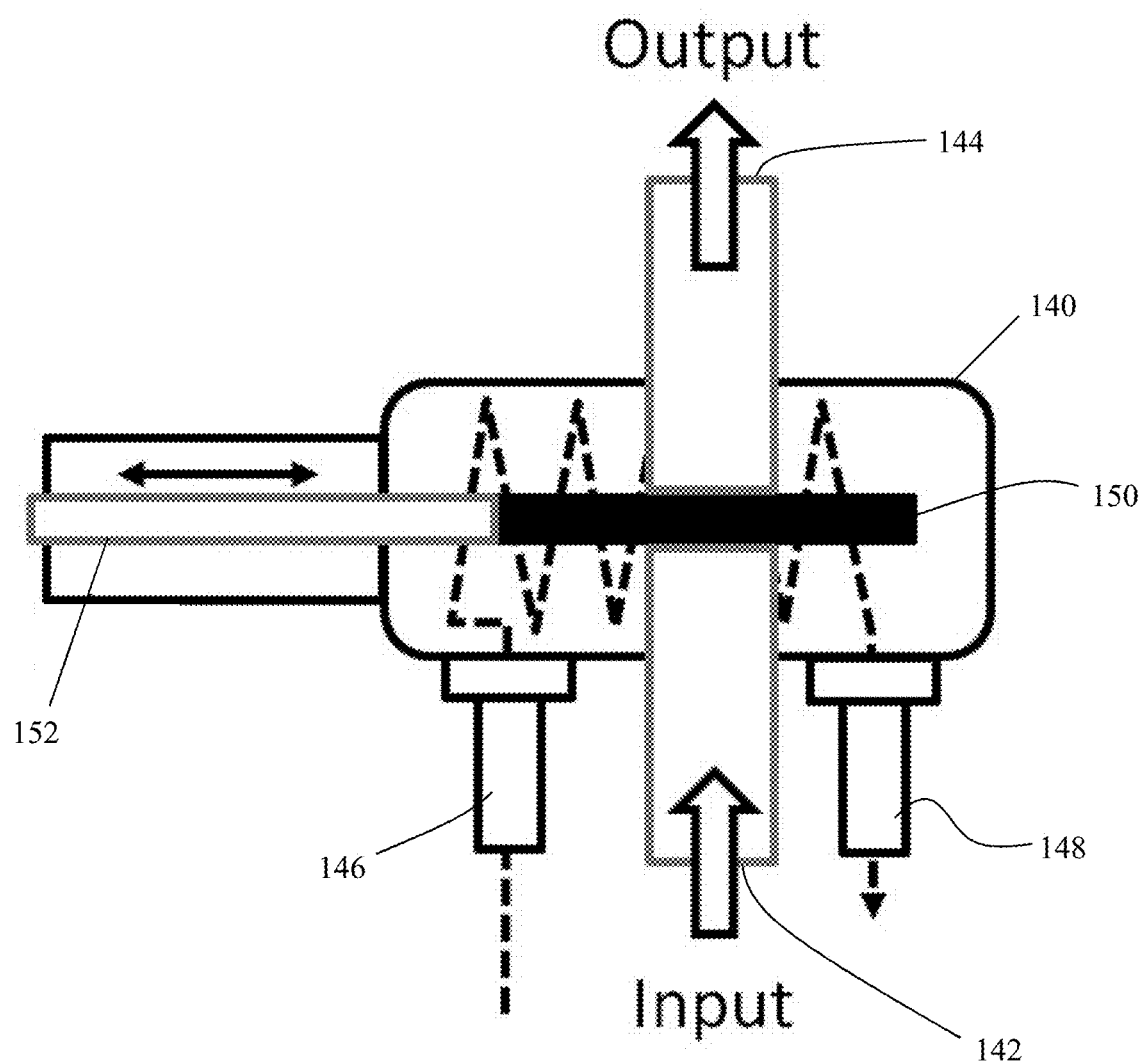
FIG. 13 is a schematic representation of a self-cleaning valve assembly for flow control in the food processor.
Figure 14:
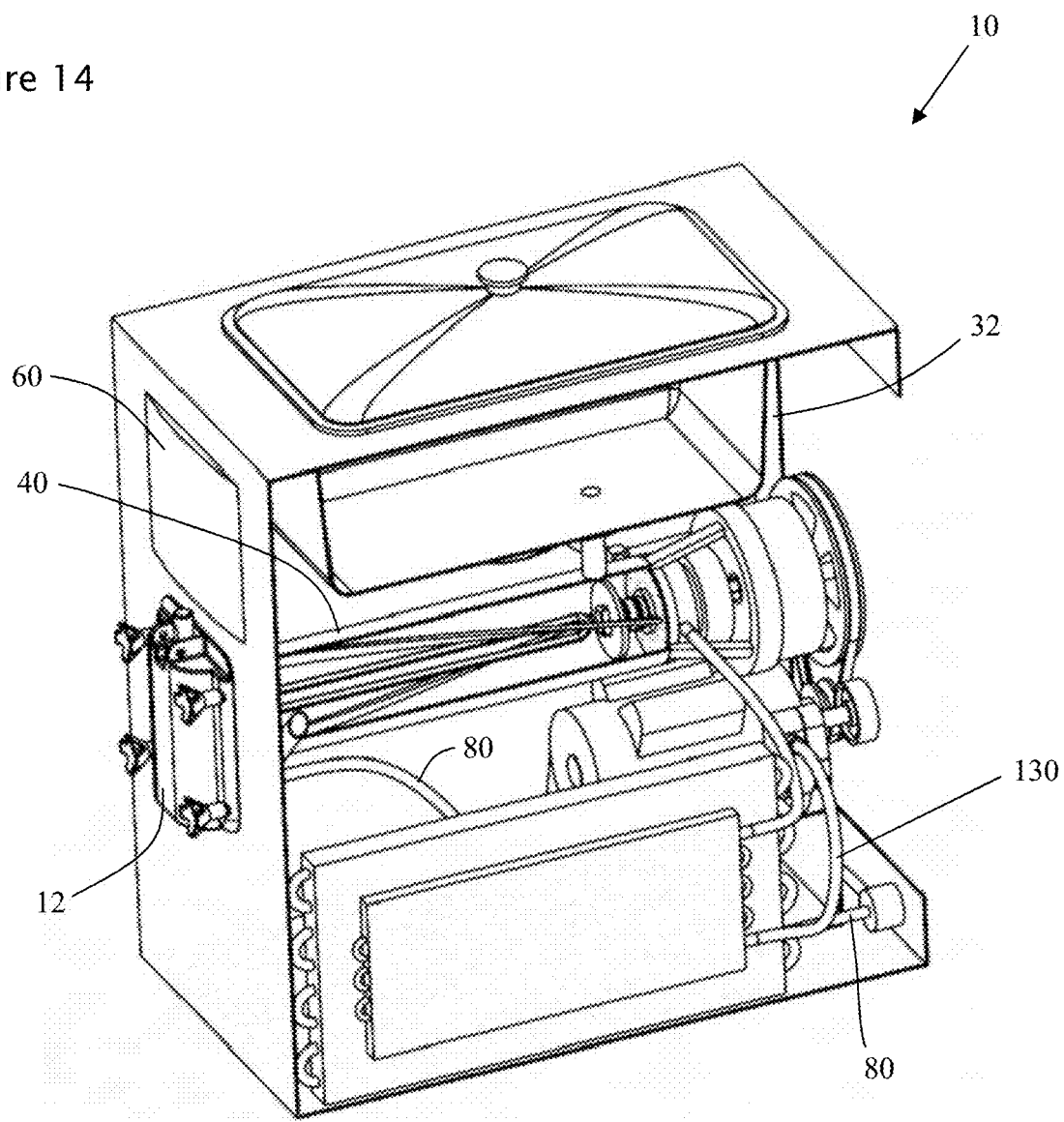
FIG. 14 is a perspective view of a configuration of the food processor showing a circulating loop between a heat exchanger and a portion of the food flow path, such as a freezer chamber.
Figure 15:
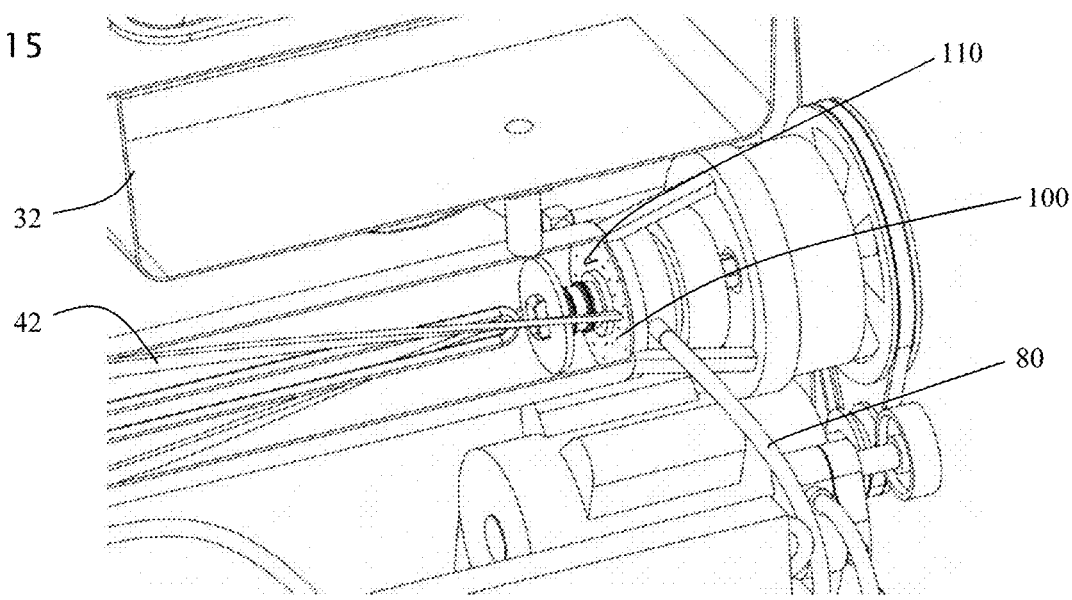
FIG. 15 is a perspective view of a configuration of the food processor showing a nozzle head for introducing a solution in a freezer chamber.
Figure 16:
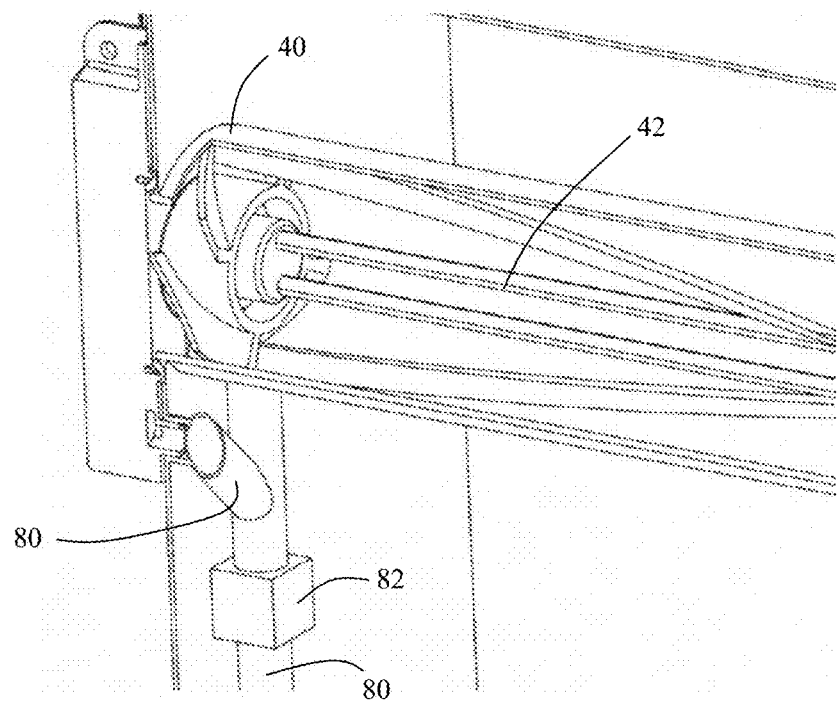
FIG. 16 is a perspective view of a configuration of the food processor showing an access port as a drain port in a freezer chamber.

The flow control valves which are exposed to the food product can be substantially self-cleaning. Referring to FIGS. 12 and 13, the flow control valves can be fluidly connected to solution input line 80 to expose an internal surface of the valve to the solution. Specifically, the flow control valves include a valve housing 140 having an inlet 142 and an outlet 144. A valve body 150 is exposed to an interior of the valve housing and selectively movable between a first position precluding flow between the inlet 142 and the outlet 144 and a second position permitting flow between the inlet and the outlet. The valve body 150 can be operably located by an actuator 152 connected to the controller 60. The actuator 152 can be any of a variety of motion control devices known in the art, including but not limited to solenoids, pistons, pneumatic or hydraulic cylinders, linear actuators or electric servos. The valve housing 140 also includes a solution inlet 146 and a solution outlet 148 configured to expose the interior of the valve housing 140, as well as the portion of the valve body 150 exposed to food product (and selectively to the solution). Thus, the valve body 150 can be selectively exposed to the solution as part of a maintenance or operating parameters of the food processor 10. The solution inlet 146 and solution outlet 148 can be fluidly connected to the solution input line 80 directly or through a valve.

FIG. 12 shows the location of the self-cleaning flow control valves. Specifically, such flow control valve can be operably located in the food flow path 20 between the hopper 32 and the processing station 40 and along the primary drain line 72 downstream of the primary drain port 70 and along the solution input line 80.

In a further configuration, the hopper 32 is a substantially closed volume incorporated within the food processor 10. It is contemplated such configuration of the food processor 10 having the incorporated hopper, the hopper 32 can be integral with the food processor or can be operably connected, but selectively separable. In this configuration, such incorporated hopper 32 does not have a substantially open top with a lid, but rather includes a port for receiving food product. The port can also function to pass solution from the food processor.

Alternatively, the hopper 32 can be configured as known in the art, wherein the hopper has a substantially open top which has a cross section substantially equal to the foot print of the hopper 32. A lid is releasably connected to the hopper 32 for closing the hopper as well as permitting access to the interior of the hopper for maintenance or cleaning.

Figure 17:
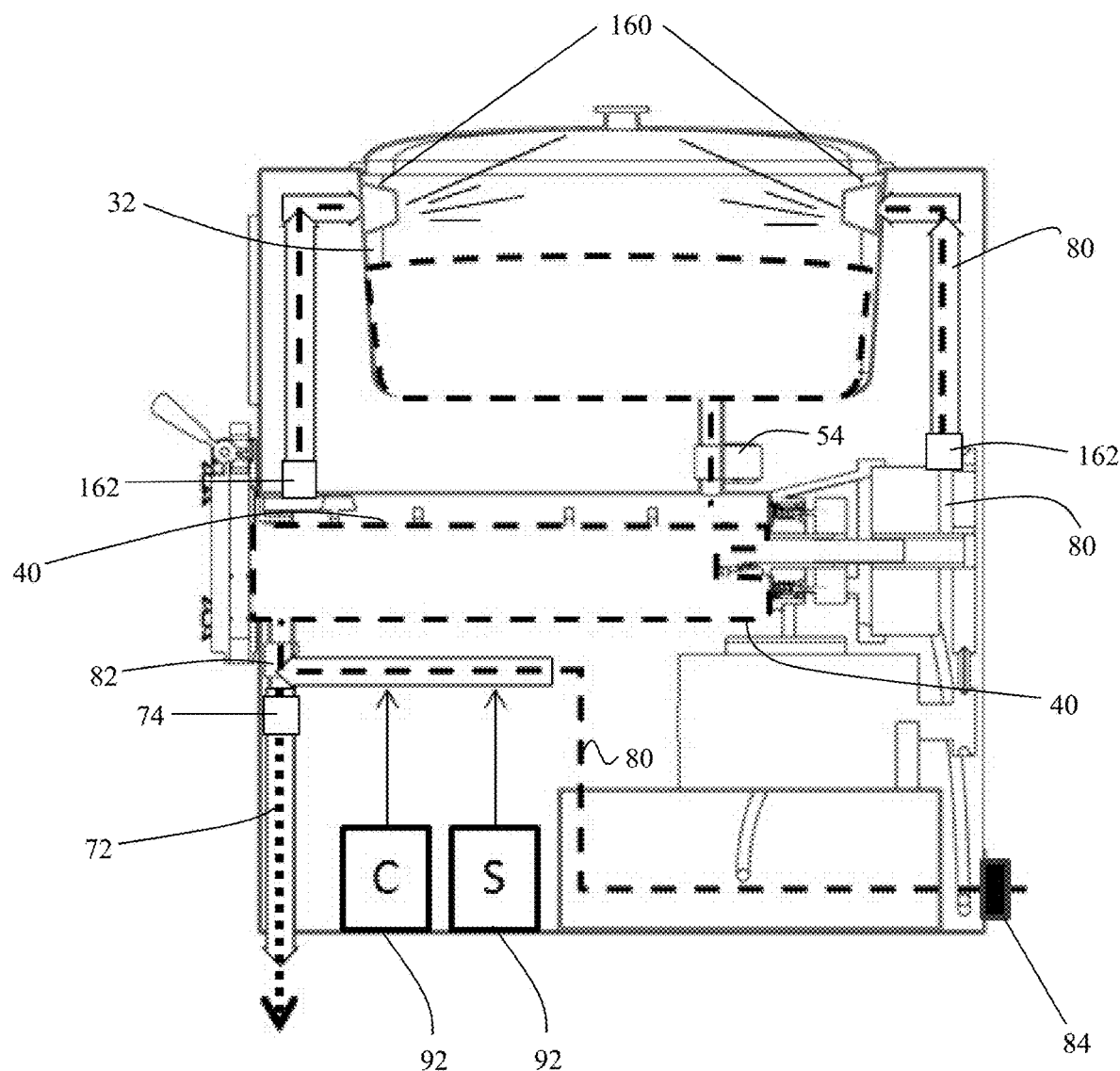
FIG. 17 is a cross sectional view of a further configuration of the food processor showing a further solution flow path.

The hopper 32 can also include a spray head 160 connected to the solution input line 80 for introducing solution into the hopper 32 with sufficient coverage and velocity to provide necessary treating such as cleaning, rinsing, disinfecting, sterilizing or sanitizing of the internal surfaces of the hopper. For example, as seen in FIG. 17, the hopper 32 includes at least one, but can include a plurality of spray heads 160 for introducing the solution into the hopper 32. The solution input line 80 is selectively connected to the spray heads 160 through flow control valves 162.

It is further contemplated the food processor 10 can include a variety of sensors know in the art, such as temperature sensors, flow sensors, ph sensors, clarity or flow content sensors typically operably connected to the food flow path 20, the solution input line 80 or the drain lines 72, 122 and which can be operably connected to the controller 60 for verifying or monitoring or initiating the protocols implementable by the controller (or the food processor).

Figure 6:
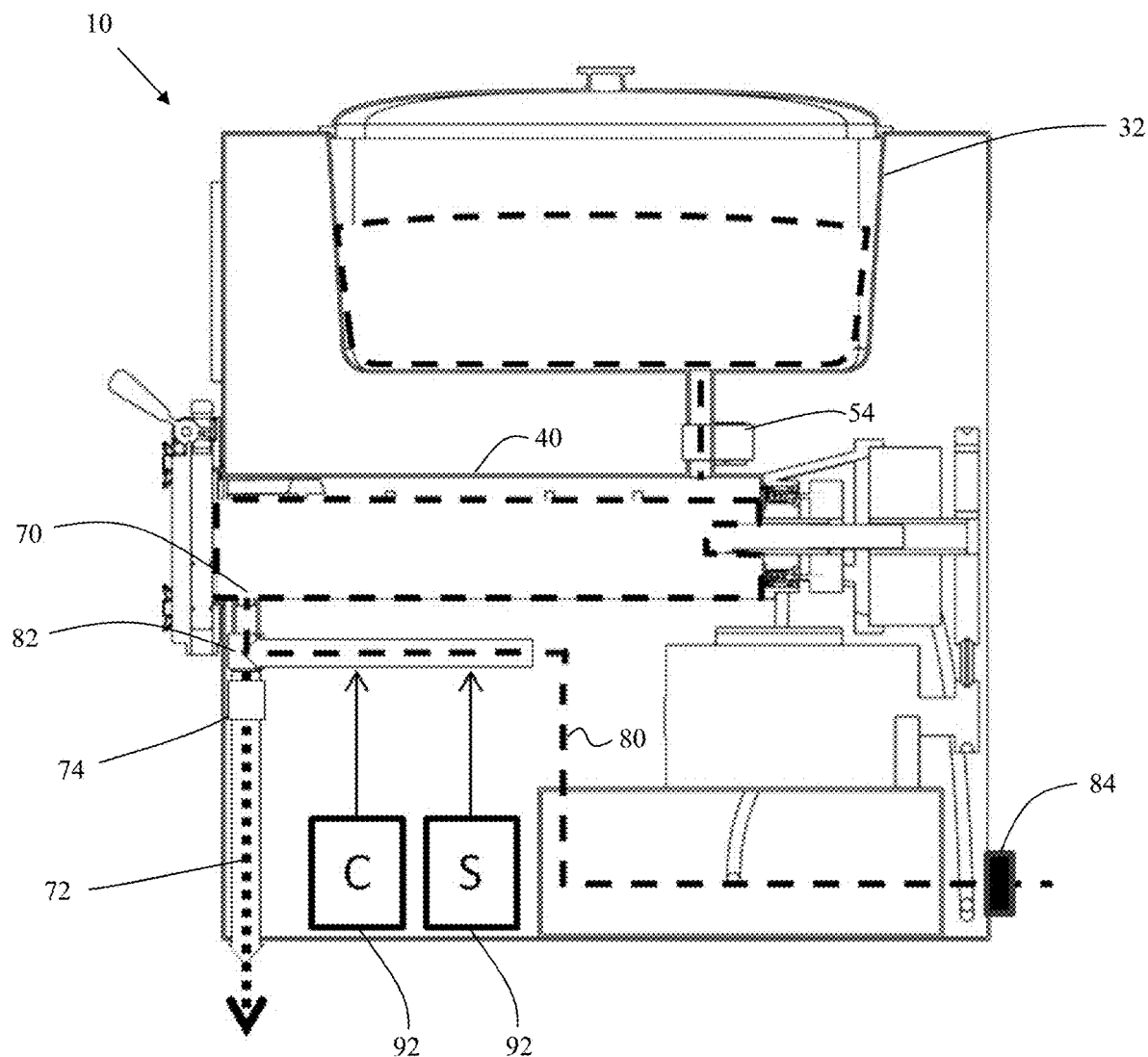
FIG. 6 is a cross sectional view of a configuration of the food processor showing a pre-rinse solution flow path.

Referring to FIG. 6, in operation, the food product in the food flow path 20 within the processing station 40 is removed. The food product is removed from the processing station 40 by disposing the flow control valve 54 in a closed position to block flow in the flow path 20 and isolate food product upstream of the processing station 40 (or at least preclude further introduction of food product into the processing station), while exposing the processing station to atmospheric pressure to break any vacuum within the processing station. It is contemplated the food flow path 20 can be exposed to or include a check valve for selectively exposing a portion of the food flow path 20 to atmospheric pressure. The valve can be a one-way check valve, which in select configurations is operably connected to the controller 60. The primary drain valve 74 is opened, allowing liquid (such as food product or solution) to drain through the primary drain line 72. Flow in the circulating loop 130 can be initiated (i) to facilitate a temperature change of the food product in the food flow path 20, such as melting the food product to flow through the primary drain port 70 or (ii) to assist through an increase in motive fluid from the solution input line 80.

The food product can drain through the primary drain valve 74 primarily driven by gravity, such as a free flow or can be pressure assisted by a positive pressure upstream or a negative pressure downstream, such as by the solution input line 80 providing a motive fluid.

The processing station 40, such as the freezer chamber, can then be pre-rinsed. The primary drain valve 74 is closed, precluding passage along the primary drain line 72. The solution input line 80 is fluidly connected to the food flow path 20 at the processing station 40 by opening the solution input valve 82 for a predetermined time period (or flow volume). Solution thus passes from the solution input line 80 through the access port 100, as the primary drain port 70 in the configuration of FIG. 6, to at least partially fill the processing station 40 with solution. Upon filling the processing station 40 with a predetermined volume of solution, the solution input valve 82 is closed, and the solution begins a residence time in the processing station 40. During the residence time, the solution in the processing station 40 can be substantially static or can be agitated, such as by operating the beater assembly 42. The amount of residence time and amount of agitation can be set by the controller 60 through control of the beater assembly 42 and the flow control valves.

The primary drain valve 74 is then opened, such as under the direction of the controller 60, allowing the solution to pass from the processing station 40. Again, draining through the primary drain port 70 can be free flow or pressure assisted. This cycle of filling, residence time (with or without agitation) and draining can be repeated as necessary to provide the desired treatment in view of the composition of the solution, the machine configuration and any governing regulations or operating procedures for the food processor 10.

It is further contemplated, the solution can be exposed to the heater 132 for temperature regulation or control before introduction into the food flow path 20, such as the processing station 40.

Thus, portions of the food flow path 20 can be exposed to a residence time of the solution without requiring continuous flow, thereby reducing water consumption of the food processor 10.

As set forth above, the solution can be any of a variety of compositions and temperatures, along with adjustable, variable or predetermined residence times, with or without agitation in a no-flow configuration for treating a portion of the food flow path in a no-flow configuration.

In addition, the solution input line 80 is selectively fluidly connected to the solution concentrate reservoirs 92 for providing the desired composition of the solution. Thus, solution profiles can be provided by the controller 60.

As seen in FIG. 7, in an alternative configuration, the food processor 10 also provides for a further no-flow treatment of the food flow path 20, or at least a portion of the food flow path 20 with the solution, without requiring dismantling of the food processor.

In this "no-flow" process, the food processor 10 employs the pressurized jet(s) of fluid from the nozzle head 110 that is exposed to at least a portion of the food flow path 20.

The processing station 40, such as the freezer chamber, in FIG. 7 is prepared by isolating the food product in the hopper 32 by closing the flow control valve 54 (or maintaining the flow valve open and allowing all the food product to pass from the hopper 32). Again, while the disclosure is understood to apply to any processing station 40, the present description is set forth in terms of the processing station being the freezer chamber. The primary drain valve 74 is opened so allow the processing station, and any portion of the upstream food flow path, to be drained. Again, the circulating loop 130 can be selectively employed under direction of the controller 60 to modify the temperature of the food product in portions of the food flow path 20 so to enhance draining.

The flow control valve 54 provides for the isolation of the hopper 32 from the freezer chamber(s), thereby allowing the freezer chamber to be emptied without exposing any fresh product mix within the hopper(s), or holding reservoir(s), from the internal treating, such as cleaning, disinfecting, rinsing, sterilizing and sanitizing process solution treatment within the portions of the food flow path 20. The in-line flow control valve 54 between the hopper 32 and the processing station 40 sufficiently isolates the food product in the hopper, such that the food product can be drained from the freezer chamber.

Once the freezer chamber is drained, the flow control valve 112 is opened permitting solution to pass from the nozzle head 110. The freezer chamber is thus exposed to a jetting or impact of the solution from the nozzle head. In addition, either simultaneously or sequentially, the flow control valve 83 is opened permitted solution pressure in the solution supply line 80 to partially unseat the gasket 16 and enter the freezer chamber. Depending on the pressure in the solution supply line and the configuration of the passage by the gasket 16, the solution may jet or weep into the freezer chamber. As the freezer chamber is sprayed with solution, the beater assembly 42 can be operated by the controller 60 to provide kinetic or static treatment of the freezer chamber with the introduced solution. The freezer chamber is sprayed for a predetermined period of time. After the predetermined time, the primary drain valve 74 opens to pass solution from the freezer chamber. It is contemplated in one mode of operation, a sufficient flow rate of solution drains through primary drain port 70 and out primary drain line 72, such that the freezer chamber does not fill with the solution introduced through the nozzle head 110 and/or about the gasket 16. As the freezer chamber is not allowed to completely fill, there is reduced solution in the freezer chamber that can inhibit impact of the introduced solution with the freezer chamber. The cycle of introduction and draining can be repeated or continued as necessary.

Again, the solution input line 80 can be thermally coupled to the heater 132, thus the controller 60 by virtue of the temperature sensors and flow sensors can impart a given temperature to the solution prior to introduction to the food flow path 20.

Figure 9:
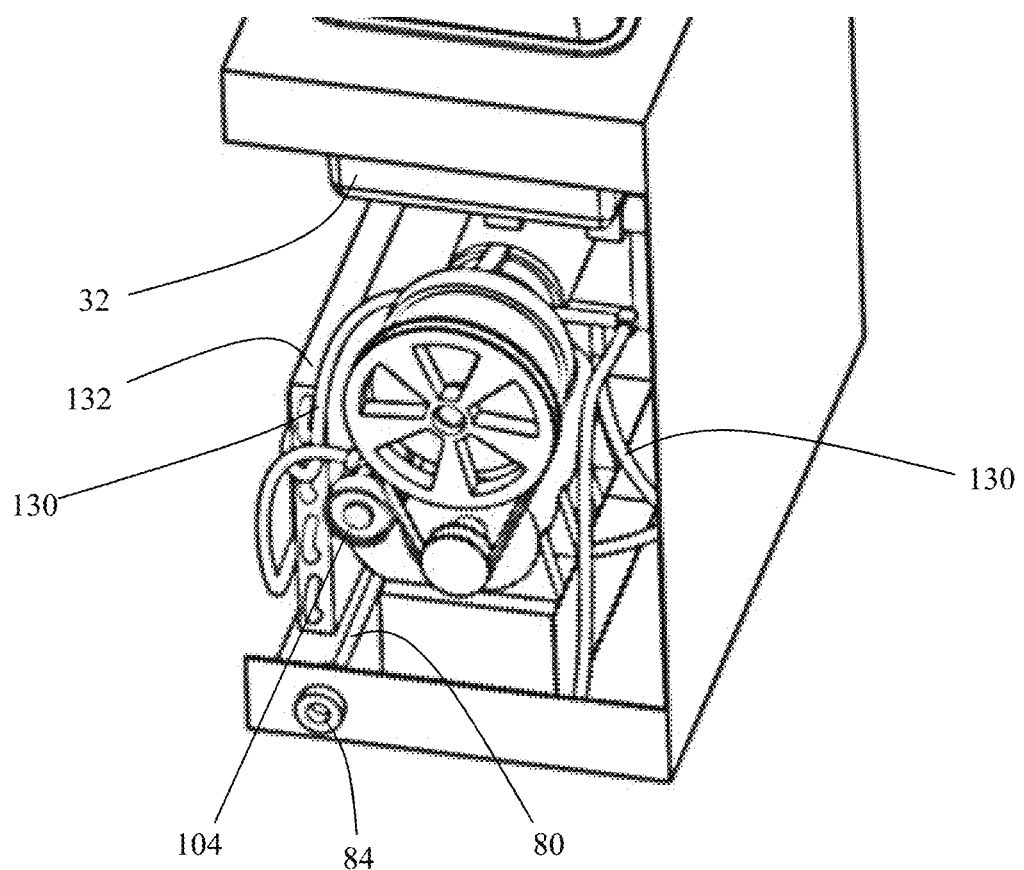
FIG. 9 is a perspective view of a configuration of the food processor showing a circulating pump.

As seen in FIGS. 7 and 9, the pump 104, functioning as the auxiliary pump can be used to increase the pressure of the solution in the solution input line 80 and/or to circulate the solution to preclude freezing of the solution within the nozzle head 110 or the lines carrying the solution.

Figure 8:
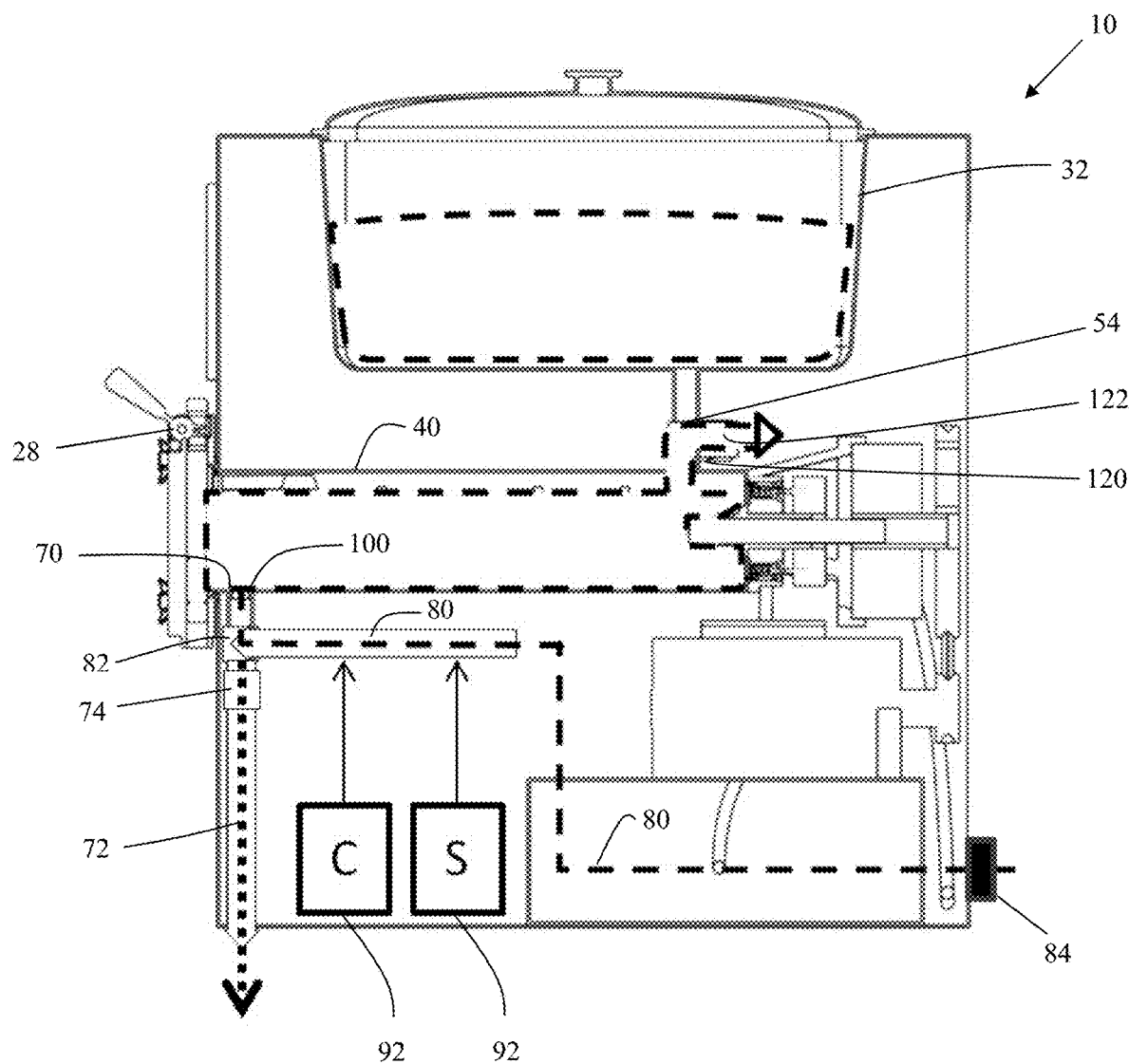
FIG. 8 is a cross sectional view of an alternative configuration of the food processor showing a post rinse solution flow path.

Referring to FIG. 8, again, while the disclosure is understood to apply to any processing station 40, the present description is set forth in terms of the processing station being the freezer chamber. The processing station 40, such as the freezer chamber, in FIG. 8 is prepared by isolating the food product in the hopper 32 by closing the flow control valve 54 (or maintaining the flow control valve open and allowing all the food product to pass from the hopper). The primary drain valve 74 is opened to allow the processing station, and any portion of the upstream food flow path, to be drained. The circulating loop 130 can be used to alter the temperature of the food product in portions of the food flow path 20 or assist in the evacuation of the food flow path, or at least sections of the food flow path.

The primary drain valve 74 is then closed and the solution input valve 82 is opened to allow solution to pass from the solution input line 80 through the primary drain port 70 and into the freezer chamber.

The beater assembly 42 can be at rest or activated to impart kinetic action of the solution on the freezer chamber. The solution enters the freezer chamber from the primary drain port 70 acting as the access port 100 and passes in a reverse direction to exit the food flow path at the flow control valve 54 to pass to the secondary drain line. It is understood, the flow of solution in the food flow path can be in either the forward or the reverse direction, such as entering at valve 122 or primary drain port 70.

After a predetermined period of time or at a predetermined time, the solution can be modified to providing cleaning, disinfecting, sterilizing, and/or sanitizing or rinsing as necessary. After a predetermined period of time, the solution input valve 82 is closed, which stops the flow of solution through the freezer chamber. The predetermined times can be selected to allow a desired residence time of the solution with the food flow path 20. It is understood this cycle can repeated as necessary. The process can be repeated with a rinse solution that is food compatible.

After a predetermined period of time, the primary drain valve 74 is opened allowing solution to drain through primary drain line 72. Typically, the solution will sufficiently drain under the force of gravity without requiring a pressure assist. The primary drain valve 74 is then closed and the flow control valves 54 and 122 are opened allowing food product from the hopper 32 to be automatically reintroduced into the freezer chamber 40.

Referring to FIG. 17, this configuration of the food processor also provides for selective treatment of the food flow path 20 with the solution. While the description is understood to apply to any processing station 40, the present description is set forth in terms of the processing station being the freezer chamber. The flow control valve 54 can be used to isolate food product in the hopper 32 from the freezer chamber, while exposing the freezer chamber to atmosphere to break vacuum (such as through the one-way check valve). While the process is set forth as isolating the hopper 32 from the freezer chamber, it is understood isolation of the hopper is not necessary to treat the food flow path 20. However, for the present treatment of the food flow path including the hopper, the hopper is drained. The primary drain valve 74 is opened, allowing the freezer chamber to drain through the primary drain port 70 and to the primary drain line 72. The circulating loop 130 can be used to alter the temperature of the food product in portions of the food flow path 20 or assist in the evacuation of the food flow path, or at least sections of the food flow path.

The hopper can then be pre-rinsed. The primary drain valve 74 is then closed and the solution input valve 82 is opened allowing the solution to flow from the solution input line 80, through a portion of the primary drain line 72, to the food flow path 20. The flow control valves exposing the solution input line 80 to the food flow path 20 are opened by the controller 60 for a predetermined period of time to allow solution to fill and/or jet into the freezer chamber and the hopper 32. As with each configuration, it is understood the solution can be water, or combination of cleaning, disinfecting, sterilizing, rinsing and/or sanitizing components. The flow control valves providing flow from the solution input line to the food flow path are then closed. The introduced solution can then be agitated within the freezer chamber for a predetermined period of time. The primary drain valve 74 is then opened to allow solution to drain through the primary drain line 72. These cycles of treating such as rinsing, cleaning, disinfecting, sterilizing or sanitizing can repeat as many times as deemed necessary through the controller 60.

As in the previous operations, the inlet temperature of the solution can be controlled by the controller 60 and the heater 132 so that the solution can be any temperature required to perform the intended function. It is understood that depending on the specific chemistry of the solution, such as for cleaning, disinfecting, rinsing, sterilizing or sanitizing, the solution can be raised to the appropriate temperature.

Figure 18:
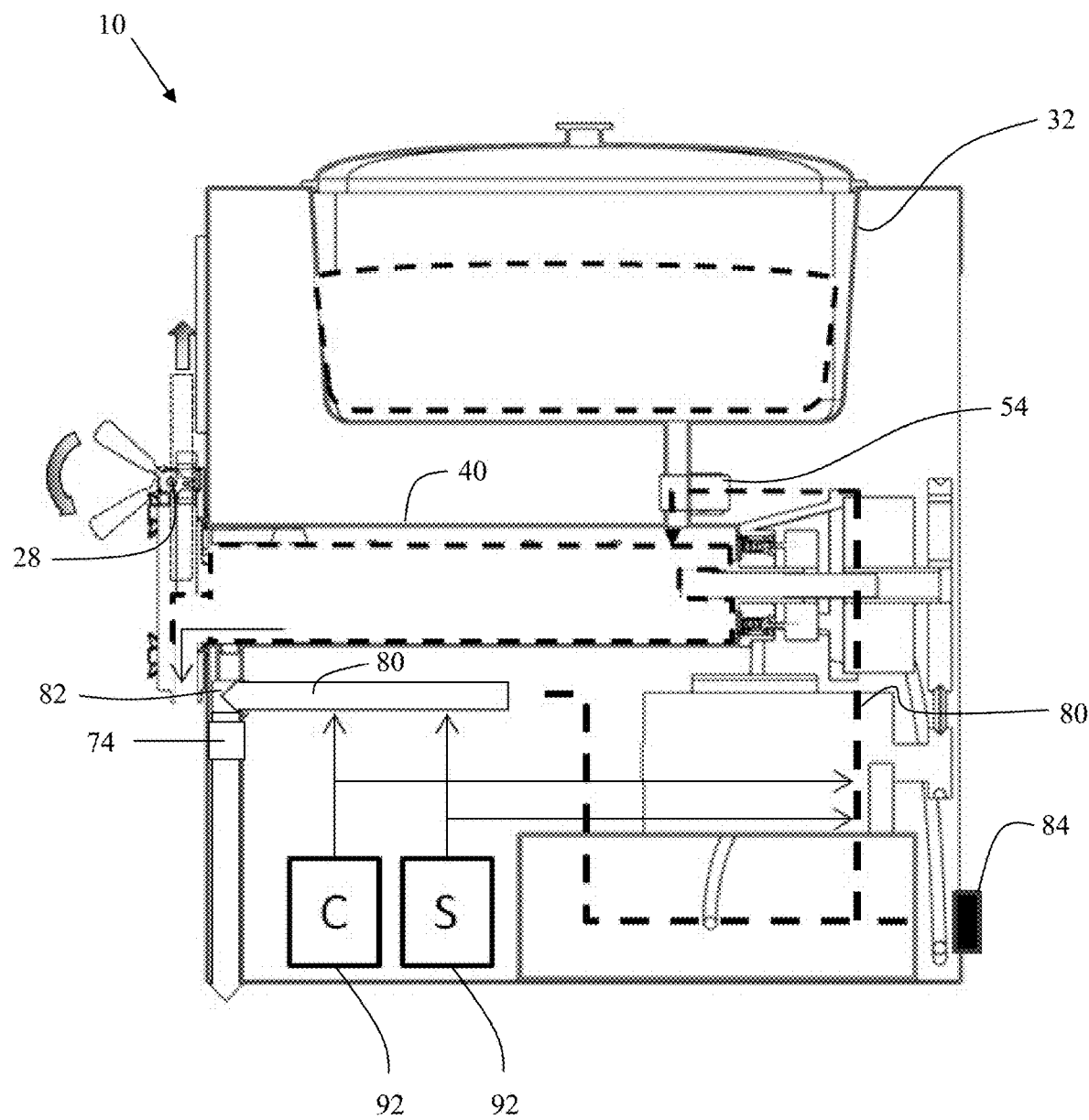
FIG. 18 is a cross sectional view of a configuration of the food processor showing a solution flow path.

In operation, referring to FIG. 18, the processing station 40, such as the freezer chamber, in FIG. 18 is prepared by isolating the food product in the hopper 32 by closing the flow valve 54 (or maintaining the flow valve open and allowing all the food product to pass from the hopper). Again, while the disclosure is understood to apply to any processing station 40, the present description is set forth in terms of the processing station being the freezer chamber. The dispensing valve 28 is opened so allow the processing station, and any portion of the upstream food flow path, to be drained with or without aid of the circulating loop 130.

Dispensing valve 28 is then left open. The flow control valve 54 (fluidly exposed to the solution input line 80) is then opened for a predetermined period of time to allow solution to flow into the freezer chamber and through the dispensing valve. The flow is thereby a continuous flow through the food flow path 20, simultaneously entering and exiting spaced locations of the food flow path. Additionally or alternatively, the flow control valve 54 is then configured to preclude solution flow into the food flow path 20. The dispensing valve 28 is then closed and a volume of solution is retained within the food flow path 20. Solution can then be agitated within the freezer chamber for a predetermined period of time, by the controller 60 actuating the beater assembly 42. After a predetermined residence time, the dispensing valve 28 is then opened to allow solution to drain through the dispensing interface and the dispensing valve. Again, it is understood the controller 60 can repeat the cycle as many times as deemed necessary.

Further, as in the previous operations, the inlet temperature of the solution can be controlled by the controller 60 and the heater 132 so that the solution can be any temperature required to perform the intended function. It is understood that depending on the specific chemistry of the solution, such as for cleaning, disinfecting, cleaning, sterilizing or sanitizing, the solution can be raised to the appropriate temperature.

Figure 19:
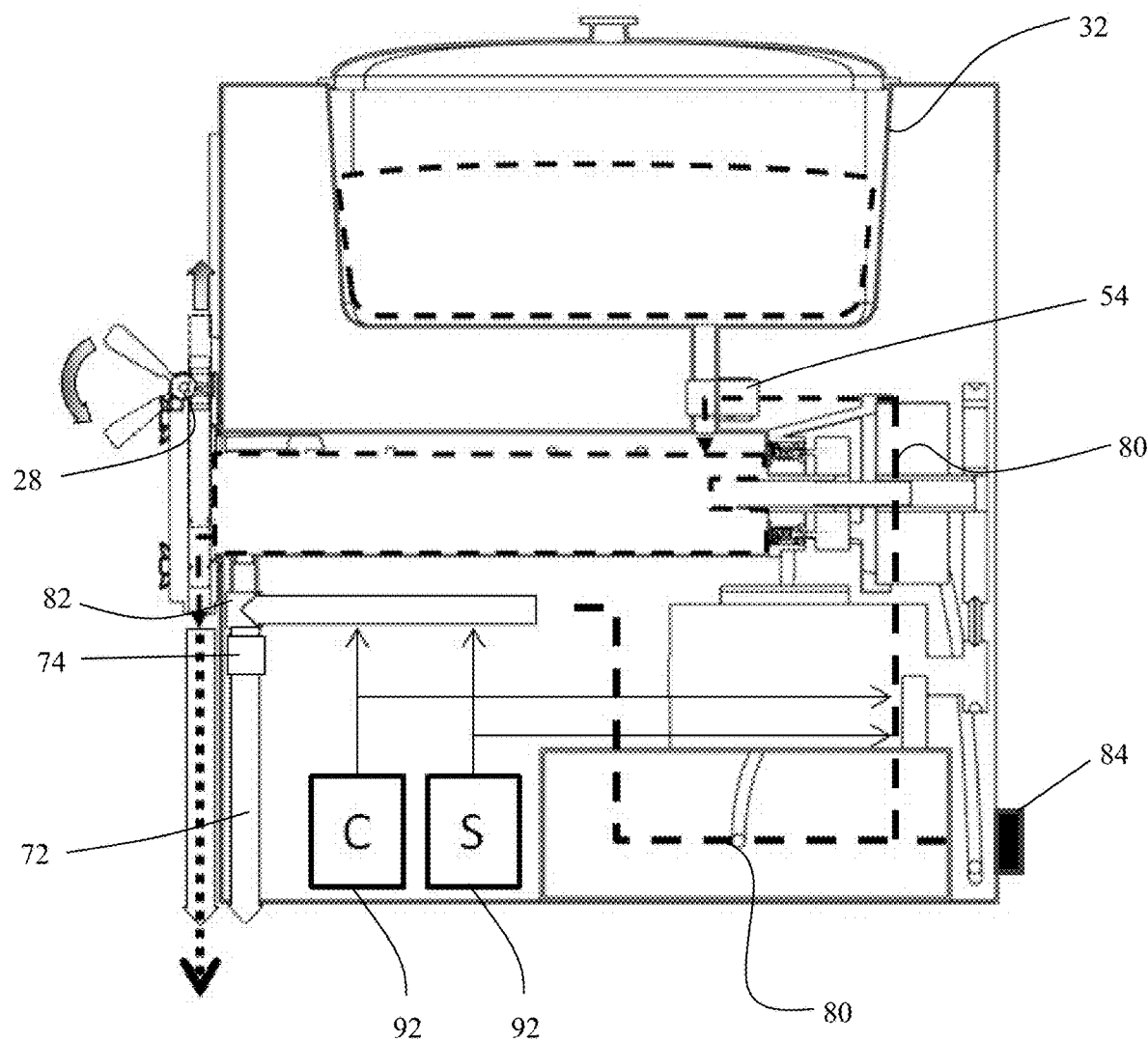
FIG. 19 is a cross sectional view of a configuration of the food processor showing a solution flow path.

In operation referring to FIG. 19, the processing station 40, such as the freezer chamber, in FIG. 19 is prepared by isolating the food product in the hopper 32 by closing the flow valve 54 (or maintaining the flow valve open and allowing all the food product to pass from the hopper). Again, while the disclosure is understood to apply to any processing station 40, the present description is set forth in terms of the processing station being the freezer chamber. The dispensing valve 28 is opened so allow the processing station, and any portion of the upstream food flow path, to be drained.

The flow control valve 54 provides for the isolation of the hopper 32 from the freezer chamber(s), thereby allowing the freezer chamber to be emptied without exposing any fresh product mix within the hopper(s), or holding reservoir(s), from the internal treating such as cleaning, rinsing, disinfecting, sterilizing and sanitizing process within the portions of the food flow path 20. The flow control valve 54 between the hopper 32 and the processing station 40 sufficiently isolates the food product in the hopper, such that the freezer chamber can be drain the freezer chamber from thawed product mix.

Dispensing valve 28 is then left opened. The flow control valve 54 (fluidly exposed to the solution input line 80) is then opened for a predetermined period of time to allow solution to continuously flow into the freezer chamber and through the dispensing valve. The flow is the continuous flow for imparting treating of the food flow path 20.

The flow control valve 54 is then configured to preclude solution flow into the food flow path 20. The dispensing valve 28 is then closed and a volume of solution is retained within the food flow path 20. Solution can then be agitated within the freezer chamber for a predetermined period of time, by the controller 60 actuating the beater assembly 42. After a predetermined residence time, the dispensing valve 28 is then opened to allow solution to drain through the dispensing interface and the dispensing valve. Again, it is understood the controller can repeat the cycle as many times as deemed necessary.

Again, as in the previous operations, the inlet temperature of the solution can be controlled by the controller 60 and the heater 132 so that the solution can be any temperature required to perform the intended function. It is understood that depending on the specific chemistry of the solution, such as for cleaning, rinsing, disinfecting, sterilizing or sanitizing, the solution can be raised to the appropriate temperature.

As the flow control valves and operation of the food processor 10 are under the direction of the controller 60, the food processor can automatically perform the desired treatment of the food flow path 20 during off-hours, including automated removal of food product from the relevant sections of the food flow path 20, draining the portions of the food flow path, introducing solution to the food flow path as well as providing a given residence time of the solution in the treated portion of the food flow path. During the treatment process, the food product in the portion of the food flow path 20 is replaced with the solution, which can be but is not limited to sterilizing, rinsing, sanitizing or cleaning solutions, so as to treat the sections of the food flow path. The introduction and control of the solution can increase the effective treatment of the portions of the food flow path 20, while eliminating the need to keep the food product chilled within the freezer chamber. The quality of the dispensed food product is thus increased as the food product is not being agitated within the freezer chamber over extended non-dispensing periods.

Therefore, the present food processor 10 provides for the introduction of the solution to portions of the food flow path 20, wherein internal components in the food flow path can be in motion, or static, and the jetting of the solution is able to physically make contact with the surface of the food flow path, reducing residual food product from those surfaces. Such residual food product, along with the solution then drains from the freezer chamber(s) directly to the drain line 72. To assist the jetting action of the introduced solution, a portion of the introduced solution can be directed around specific aspects of the freezer chamber such as the beater assembly 42, the front freezer door, seals and gaskets 16. Once a predetermined residence time has be met, the jetting and/or flushing process is temporarily disrupted, drain valves are opened, and the portion of the food flow path 20, such as the freezer chamber(s) are then flushed with flowing solution (water/cleaner/disinfectant/sterilizer/sanitizer) to remove waste and treat surfaces.

The food processor 10 thus can provide a closed loop system that can replace the food product within the food flow path with solution (such as sanitizing, cleaning, sterilizing, disinfecting or rinse) during standby status of the food processor. This not only can provide extended sanitizing to the select portions of the food flow path 20, but it also allows for energy savings coupled with higher product quality due to the fact that the food product is not being exposed to multiple extended periods of beater agitation necessary to keep the food product mobile for product quality purposes.

Thus, the present disclosure provides for removing food product from at least a portion of the food flow path, treating the portions of the food flow path with the solution; draining the solution and rinsing, without requiring operator intervention. The controller 60 can then automatically reintroduce food product into the food flow path in preparation for dispensing finished food product. The present system thus allows the food product to be removed from at least portions of the food flow path, such that those portions of the food flow path can be treated with solution, wherein the food product is only reintroduced into the food flow path after appropriate treatment of the food flow path and necessary timing for bringing the food processor 10 back on line.

In a further configuration, the solution is disposed within a portion of the food flow path 20, and at least a portion of the solution is cooled to a temperature sufficient to form a flowable media formed of solid frozen particles of the solution. It is contemplated the portion of the solution that is frozen can be from 1% to 100% of the mass of the solution. The percentage that is frozen does not preclude flowable movement of the media through the relevant portion of the food flow path 20. Movement of the frozen particles along the food flow path 20 treats, such as scrubs, the surfaces of the food flow path, thereby dislodging food product particles from surfaces. The flow rate of the flowable media along the food flow path is sufficient to entrain the dislodged food product particles.

By using the solution to form the flowable particles, in certain configurations, the scrubbed portion of the food flow path does not require subsequent rinsing or flushing prior to processing food product.

Depending on the specific composition of the solution, the food processor 10, and particularly the freezer chamber configuration of the processing station 40, the solution is cooled to a temperature sufficient to form the flowable media formed of solid frozen particles of the solution, which temperature can be approximately 15° F., or 20° F., or 25° F. or any appropriate temperature to form the flowable media formed of solid frozen particles of the solution.

By passing the flowable media formed of solid frozen particles of the solution along at least a portion of the food flow path 20, the flowable media treats the food flow path by scrubbing or abrading the surfaces to dislodge food particle from the surfaces. As set forth above, the flow rate of the flowable media is sufficient to entrain the dislodged food product and transport the dislodged food product to pass from the food flow path along with the flowable media.

The formation of the flowable media from the solution allows the simultaneous scrubbing of the food flow path and the rinsing, sanitizing, cleaning, disinfecting or sterilizing of the portion of the food flow path, depending on the specific composition of the solution.

The passage of the flowable media along the food flow path can be (i) a continuous flow, where the flow rate is sufficient to impart the flowable media with the food flow path 20 to dislodge food product or (ii) an intermittent flow incorporating agitation or residence times at locations along the food flow path. Thus, the beater assembly 42 can be selectively operated with the flowable media in the food flow path to enhance the scrubbing of the media on the surfaces.

Thus, certain configurations provide for a method including locating a volume of the solution within a portion of the food flow path 20 in the food processor 10; reducing a temperature of the solution to create a flowable media formed of solid frozen particles of the solution; and passing the flowable media through the portion of the food flow path to scrub the portion of the food flow path. As set forth above, it is contemplated the solution can be water or water in combination with at least one of citric acid, fumaric acid, humic acid, acetic acid, or ascorbic acid. Further, depending upon the specific composition of the solution, the necessary temperature for forming the solid frozen particles to provide the flowable media can be typically between approximately 15° F. and 28° F., wherein certain solutions form the necessary frozen particles without forming a single solid mass at approximately 23° F. to 27° F.

The food processor 10 for forming the flowable media and passing the flowable media along a portion of the food flow path includes the reservoir in the food flow path for retaining the food product, the freezer chamber in the food flow path fluidly connected to the reservoir and having the inlet port for passing food product into the freezer chamber and the outlet port for passing food product from the freezer chamber; a volume of the solution in the freezer chamber; wherein the freezer chamber is configured to reduce a temperature of the solution to form a flowable media formed of solid frozen particles of the solution. The food processor 10 can include the controller for controlling the freezer chamber to form the flowable media. In addition, the controller can be used to operate the beater assembly to impact the flowable media against the food flow path. Further, the controller, or operator input, can control the freezer chamber to the necessary temperature for forming the solid frozen particles to provide the flowable media can be typically between approximately 15° F. and 28° F., wherein certain solutions form the necessary frozen particles without forming a single solid mass at approximately 23° F. to 27° F.

The imparted treating of at least a portion of the food flow path through continuous flow, agitation, flowable media or any combination at least reduces the amount of residual food product in the food flow path and reduces microbial activity in the food flow path, such as on the surfaces of the food flow path.

The solution can include commercially available product, such as ProNatural Antimicrobial MultiSurface Cleaner, LEXX Liquid Sanitizer and Cleaner Concentrate and ProNatural All Purpose Cleaner/Degreaser. The ProNatural Antimicrobial MultiSurface Cleaner has ingredients, as defined by the EPA, as posing little or no risk to human health or the environment along with the ability to kill odor causing bacteria. Both ProNatural Antimicrobial MultiSurface Cleaner and ProNatural All Purpose Cleaner/Degreaser are based on ingredients that are naturally derived, non-corrosive, and actually qualify as FDA approved direct food additives.

The ProNatural Antimicrobial MultiSurface Cleaner is based on a natural acid and a naturally derived anionic surfactant. These ingredients meet the US EPA Minimum Risk Pesticide requirements. The EPA has determined that these ingredients pose little to no risk to human health or the environment and therefore are exempt from the formal EPA registration that is required of other cleaning products designated with an EPA label.

| ProNatural Antimicrobial Efficacy Studies | | |
|---|---|---|
| Pathogen | Contact Time | Log Reduction |
| Bacteria (gm +) | | |
| Staphylococcus aureus (gm +) | 30 sec | >7.00 |
| Listeria monocytogenes (gm +) | 30 sec | >6.26 |
| Enterococcus faecalis (VRE) (gm +) | 5 min | >7.41 |

-continued

| ProNatural Antimicrobial Efficacy Studies | | |
|---|---|---|
| Pathogen | Contact Time | Log Reduction |
| MRSA (gm +) | 5 min | >6.13 |
| Clostridium difficile (gm +) | 15 min | 0.72 |
| Bacteria (gm −) | | |
| Eschericia coli (gm −) | 30 sec | >7.00 |
| Pseudomonas aeruginosa (gm −) | 60 sec | >7.00 |
| Legionella pneumophilia (gm −) | 60 sec | >6.00 |
| Acinetobacter baumannii (gm −) | 60 sec | >6.00 |
| Stenotrophomonas maltophilia (gm −) | 60 sec | >6.00 |
| Enterobacter cloacae (CRE) (gm −) | 5 min | >7.43 |
| Enterobacter aerogenes (gm −) | 5 min | >5.34 |
| Salmonella enterica (gm −) | 5 min | >5.63 |
| Neisseria gonorrhoeae (gm −) | 5 min | >3.66 |
| Yeast/Mold | | |
| Candida albicans | 15 min | >6.00 |
| Dekkera bruxellensis | 5 min | >5.40 |
| Viruses | | |
| Norovirus | 10 min | >4.25 |

Thus, the solution being only water or a mixture including water can be sufficiently cooled to form the frozen solid particles as a flowable media. It is also contemplated the solution can include additives such as sodium bicarbonate, trisodium phosphate, ground shells or husks. That is, other food compatible solid particles can be added to the solution for treating the food flow path 20, such as by providing scrubbing or abrasive contact with the food flow path. In certain configurations, the solution with the solid additive is sufficiently cooled to form the frozen solid particles as the flowable media. However, it is contemplated that inclusion of insoluble additives into the solution can provide for treatment of the food flow path 20 without requiring the temperature reduction of the solution to form the frozen solid particles. That is, while the insoluble additives can be employed in the frozen solid particles of the solution, the insoluble solid additives also enable the treatment of the food flow path 20, such as by scrubbing, at temperatures above freezing. The average particle size of the insoluble additives can range from 0.0001 mm to approximately 0.05 mm depending on the portion of the food flow path 20 to be treated. In other configurations, the particle size of the insoluble additives approximates typical flour particle size distributions which can be approximately 89-98% of the particles within the size ranges 10-41 pm and 41-300 μm, and 2-11% of the particles distributed within the size range <10 μm.

Thus, the disclosure provides the food processor having the food flow path 20; the reservoir 32 in the food flow path for retaining a food product; the freezer chamber 40 in the food flow path fluidly connected to the reservoir and having an inlet port 44 for passing food product into the freezer chamber, the outlet port 46 for passing food product from the freezer chamber and the access port 100; and the solution input line 80 independent of the food flow path, the solution input line connected to the access port for introducing a solution into the freezer chamber. The access port 100 can be the drain port 70 or the nozzle head, or the separate drain port can be located in the freezer chamber 40, or the food processor can further include a controller 60 for selectively imparting a continuous flow of a solution into at least a portion of the food flow path 20, wherein the continuous flow sufficient to treat the portion of the food flow path.

Also provided is the food processor 10 having the reservoir 32 for retaining a food product; the freezer chamber 40 fluidly connected to the reservoir and having the inlet port 44 for passing food product into the freezer chamber, the outlet port 46 for passing food product from the freezer chamber and the access port 100; the solution component source 92; and the solution input line 80 connected to the solution component source and the access port 100 for passing the solution having the solution component into the freezer chamber. In this configuration, the access port is the drain port 70; or the food processor can include the controller 60 for selectively imparting a continuous flow of a solution into at least a portion of the food flow path 20, or the continuous flow sufficient to treat the portion of the food flow path.

A method is provided including the steps of isolating a supply of food product from the downstream freezer chamber 40, the freezer chamber having the inlet port 44 for receiving the food product into the freezer chamber and the outlet port 46 for passing the food product from the freezer chamber in a forward direction; and one of passing solution into and from the freezer chamber through the access port 100. The method further includes draining the freezer chamber through the drain port 70 and introducing a solution into the drained freezer chamber, wherein the supply of food product is a reservoir and introducing the solution includes passing the solution through a nozzle head; or actuating the beater assembly 42 within the freezer chamber; or introducing a solution into the freezer chamber through the drain port; or heating the solution prior to introduction into the freezer chamber; or heating a portion of the freezer chamber after isolating the supply of food product; or agitating a volume of solution within the freezer chamber; or maintaining a volume of an introduced solution within the freezer chamber above a freezing temperature of the solution; or simultaneously draining at least a portion of the introduced solution through the drain port; or retaining a volume of the introduced solution in the freezer chamber; or draining the retained volume of introduced solution from the freezer chamber through the drain port; or fluidly connecting the reservoir to the freezer chamber, wherein draining the food product is one of a free flow and a pressure assisted movement of the food product; or raising a temperature of the food product in the freezer chamber prior to draining the food product from the freezer chamber; or exposing the solution to a temperature below ambient temperature and maintaining the solution in a liquid state prior to introduction into the freezer chamber; or draining the isolated freezer chamber through a drain port and imparting a continuous flow of a solution into at least a portion of the food flow path, wherein the continuous flow sufficient to treat the portion of the food flow path.

A method is also disclosed including the steps of providing the food processor 10 with the flow control valve 54 intermediate the reservoir 32 for retaining a volume of food product and the downstream freezer chamber 40, the freezer chamber having the inlet port 44 for receiving the food product into the freezer chamber and the outlet port 46 for passing the food product from the freezer chamber; and providing the food processor with the drain port 70 for draining the freezer chamber. The method can further include the step of providing the flow control valve 82 for selectively introducing a solution into the freezer chamber 40; or providing the controller 60 for controlling the flow control valve to selectively isolate the reservoir from the freezer chamber; or providing the heater 138 for heating at least a portion of the freezer chamber; providing the heater for heating the solution prior to introduction into the freezer chamber; or exposing the solution to a temperature above a solution freezing temperature prior to introduction into the freezer chamber; or exposing the solution to a temperature below ambient temperature and maintaining the solution in a liquid state prior to introduction into the freezer chamber; or locating the drain port in the freezer chamber; or providing for selectively imparting a continuous flow of a solution into the freezer chamber to treat the freezer chamber.

An additional method is providing including the steps of isolating the supply of food product from the downstream freezer chamber 40, the freezer chamber having the inlet port 44 for receiving the food product from the supply into the freezer chamber and the outlet port 46 for passing the food product from the freezer chamber; draining the freezer chamber through the drain port; and introducing a solution into the freezer chamber independent of the inlet port and the outlet port. This method further contemplates the steps of heating the solution prior to introducing the solution into the freezer chamber 40; or agitating a volume of the solution within the freezer chamber; or or simultaneously with introducing the solution, draining at least a portion of the introduced solution through the drain port, wherein introducing the solution into the freezer chamber includes passing the solution through the access port 100 which is located in the freezer chamber and wherein introducing the solution into the freezer chamber includes introducing a solution into the drained freezer chamber. The method contemplates the further step of imparting a continuous flow of a solution through the freezer chamber to treat the freezer chamber.

An additional method includes the steps of simultaneously (i) draining a freezer chamber of a food processor through a drain port, the freezer chamber including an inlet for receiving a food product into the freezer chamber and an outlet for passing the food product from the freezer chamber and (ii) introducing a solution into the freezer chamber. The method can include the further steps of isolating the upstream supply of food product from the freezer chamber; or introducing the solution through the access port 100; introducing the solution through the access port in the freezer chamber; wherein draining the freezer chamber includes draining through the drain port located in the freezer chamber.

Another method includes the steps of constructing a food processor for (i) draining a freezer chamber through a drain port, the freezer chamber having an inlet for receiving a food product and an outlet for passing the food product and (ii) introducing a solution into the freezer chamber. This method can further include the steps of configuring the food processor for simultaneously draining the freezer chamber and introducing the solution into the freezer chamber, wherein introducing the solution into the freezer chamber includes introducing the solution through an access port or introducing the solution into the freezer chamber includes introducing the solution through the access port located 100 in the freezer chamber, wherein constructing the food processor includes locating the drain port in the freezer chamber.

Yet another method includes the step of providing the food processor configured to isolate the supply of a food product from the downstream freezer chamber 40, the freezer chamber having the inlet port 44 for receiving the food product from the supply of food product into the freezer chamber and the outlet port 46 for passing the food product from the freezer chamber; and providing the food processor for (i) draining the freezer chamber through the drain port and (ii) introducing a solution into the freezer chamber. This method can include the additional steps of providing the food processor with the access port 100 for introducing the solution into the freezer chamber; or providing the food processor for simultaneously (i) draining the freezer chamber and (ii) introducing the solution into the freezer chamber; or introducing the solution into the freezer chamber includes introducing the solution through an access port in the freezer chamber; or introducing the solution into the freezer chamber includes introducing the solution independent of the inlet port and the outlet port; or providing the food processor with the drain port in the freezer chamber; or providing the food processor to implement a continuous flow of the solution through the freezer chamber, the continuous flow treating the freezer chamber.

Another food processor 10 is disclosed having the reservoir for retaining a food product; the processing station 40 fluidly connected to the reservoir, the processing station configured to retain a given volume of food product, the processing station having the inlet port 44 receiving the food product from the reservoir and the outlet port 46 for passing the food product from the processing station; the drain port fluidly connected to the processing station for draining at least a portion of the given volume; the drain valve connected to the drain port for selectively permitting and precluding flow through the drain port; and the dispensing interface 26 receiving the food product from the outlet port of the processing station. This food processor 10 can further include the dispensing interface configured to pass food product from the food processor; or the dispensing interface including the dispensing valve; or the drain port being located to drain at least a majority of the given volume by one of gravity induced flow and pressure assisted flow; or the drain port is located in the processing station; or the drain port is located in the bottom surface of the processing station; or the control valve is used for enabling a continuous flow of a solution through the processing station.

A further method includes the steps of providing a food processor with the flow control valve intermediate the reservoir 32 for retaining a volume of food product and the downstream processing station 40, the processing station having the inlet port 44 for receiving food product into the processing station and the outlet port 46 for passing food product from the processing station; providing the food processor with the drain port for draining the processing station; and providing the food processor with the access port 100 for passing one of a cleaning solution, a sanitizing solution, disinfecting solution, sterilizing solution and a rinse solution to the processing station. This method can include the additional steps of providing the solution input valve for selectively introducing one or the cleaning solution, the sanitizing solution, the disinfecting solution, and the rinse solution into the processing station; or providing the controller 60 for controlling the flow control valve to selectively isolate the reservoir from the processing station; or providing the heater 138 for heating at least a portion of the processing station; or heating the solution prior to introduction into the processing station; or maintaining the solution above a solution freezing temperature prior to introduction into the processing station; or exposing the solution to a temperature below ambient temperature and maintaining the solution in a liquid state prior to introduction into the processing station; or configuring the processing station as the freezer chamber; or locating the drain port in the processing station; or providing a valve for imparting a continuous flow of one of the cleaning solution, the sanitizing solution, the disinfecting solution, and the rinse solution through the processing station.

The disclosure provides the method having the steps of locating a volume of a solution within a portion of the food flow path 20 in the food processor 10; reducing a temperature of the solution to create a flowable media including solid frozen particles of the solution; and passing the flowable media through a portion of the food flow path to scrub the portion of the food flow path. This method can further include the steps of using water as the solution; or including at least one of citric acid, fumaric acid, humic acid, acetic acid, or ascorbic acid in the solution; or having the flowable media with a temperature greater than 15° F. or not requiring subsequent rinsing of the food flow path prior to contact with food; or sufficiently impacting the flowable media with the food flow path 20 to dislodge food product from surfaces of the food flow path; or providing a flow rate of the flowable media sufficient to entrain food product particles dislodged from surfaces of the food flow path.

A food processor is disclosed having the food flow path 20; the reservoir in the food flow path for retaining a food product; the freezer chamber 40 in the food flow path fluidly connected to the reservoir and having the inlet port 44 for passing food product into the freezer chamber and the outlet port 46 for passing food product from the freezer chamber; and the solution in the freezer chamber; wherein the freezer chamber is configured to reduce a temperature of the solution to form the flowable media formed of solid frozen particles of the solution. The food processor can be configured wherein the temperature of the solid frozen particles of the solution is greater than 15° F.; or wherein the temperature of the solid frozen particles of the solution is greater than 20° F.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A food processor, comprising:
    (a) a food flow path configured to pass a food product from an upstream portion to a downstream portion, the food flow path including a reservoir for retaining a food product;
    (b) a freezer chamber in the food flow path, the freezer chamber fluidly connected to the reservoir by a portion of the food flow path, the freezer chamber having an inlet port for receiving the food product into the freezer chamber and an outlet port for passing the food product from the freezer chamber; and
    (c) a self-cleaning flow control valve in the food flow path, the self-cleaning flow control valve having a valve housing and a valve body, the valve housing having (i) an interior, (ii) an inlet connected to the food flow path, (iii) an outlet connected to the food flow path, wherein the valve body is exposed to the interior and the food flow path and is selectively moveable within the valve housing between a first position precluding flow between the inlet and the outlet and a second position wherein the valve body is configured to selectively permit food product to pass from the inlet to contact the valve body and the interior to pass to the outlet, (iv) a solution inlet, and (v) a solution outlet, the solution inlet and the solution outlet fluidly connected to the interior, the food flow path, and the valve body exposed to the interior, wherein a solution passing from the solution inlet (aa) contacts the interior of the valve housing and the valve body exposed to the interior to impart at least a cleaning of the interior of the valve housing and the valve body exposed to the interior, and (bb) passes to the solution outlet.

2. The food processor of claim 1, further comprising a solution input line connected to the solution inlet.

3. The food processor of claim 1, wherein the self-cleaning flow control valve in the food flow path is intermediate the reservoir and the freezer chamber and configured to selectively preclude fluid communication between the reservoir and the freezer chamber.

4. The food processor of claim 1, further comprising a solution reservoir fluidly connected to the solution inlet.

5. The food processor of claim 1, further comprising a controller selectively exposing the solution inlet to a source of solution.

6. The food processor of claim 1, further comprising a controller selectively imparting a flow of solution into the interior of the valve housing.

7. The food processor of claim 1, further comprising a pressurized source of a solution connected to the solution inlet.

8. The food processor of claim 7, wherein the pressurized source includes one of a pump or pressurized gas.

9. The food processor of claim 1, wherein the freezer chamber includes an access port.

10. The food processor of claim 1, further comprising a drain port downstream of the freezer chamber.

11. The food processor of claim 1, further comprising a drain port upstream of the freezer chamber.

12. The food processor of claim 1, further comprising a drain port intermediate the freezer chamber and a downstream dispensing valve.

13. The food processor of claim 1, further comprising a drain port and an access port in the freezer chamber.

14. The food processor of claim 1, further comprising a controller selectively imparting a continuous flow of solution through the solution inlet and into the interior of the valve housing.

15. The food processor of claim 1, further comprising an actuator connected to the valve body and a controller connected to the actuator, wherein the controller is configured to move the actuator.

* * * * *